US012029254B2

(12) United States Patent
Marubashi et al.

(10) Patent No.: US 12,029,254 B2
(45) Date of Patent: Jul. 9, 2024

(54) FLAVOR-GENERATING DEVICE, POWER SUPPLY UNIT, METHOD FOR CONTROLLING FLAVOR-GENERATING DEVICE, AND PROGRAM

(71) Applicant: Japan Tobacco Inc., Tokyo (JP)

(72) Inventors: Keiji Marubashi, Tokyo (JP); Takuma Nakano, Tokyo (JP); Hajime Fujita, Tokyo (JP)

(73) Assignee: JAPAN TOBACCO INC., Tokyo (JP)

( * ) Notice: Subject to any disclaimer, the term of this patent is extended or adjusted under 35 U.S.C. 154(b) by 628 days.

(21) Appl. No.: 17/203,791

(22) Filed: Mar. 17, 2021

(65) Prior Publication Data

US 2021/0195961 A1  Jul. 1, 2021

Related U.S. Application Data

(63) Continuation of application No. PCT/JP2018/034675, filed on Sep. 19, 2018.

(51) Int. Cl.
*A24F 40/57* (2020.01)
*A24F 40/53* (2020.01)
*H02J 7/00* (2006.01)

(52) U.S. Cl.
CPC .............. *A24F 40/57* (2020.01); *A24F 40/53* (2020.01); *H02J 7/0063* (2013.01)

(58) Field of Classification Search
CPC ........ A24F 40/57; A24F 40/53; A24F 40/465; A24F 40/10; A24F 40/50; A24F 47/00;
(Continued)

(56) References Cited

U.S. PATENT DOCUMENTS 5,144,962 A * 9/1992 Counts ..................... A24D 1/20
  131/194
9,687,663 B2 * 6/2017 He ........................... H02J 50/80
(Continued)

FOREIGN PATENT DOCUMENTS

CN   108523247 A   9/2018
JP   63-184776 A   7/1988
(Continued)

OTHER PUBLICATIONS

International Search Report and Written Opinion mailed on Nov. 20, 2018, received for PCT Application PCT/JP2018/034675, Filed on Sep. 19, 2018, 14 pages including English Translation.
(Continued)

*Primary Examiner* — Alexander Gilman
(74) *Attorney, Agent, or Firm* — XSENSUS LLP

(57) ABSTRACT

This flavor-generating device includes: a circuit in which a power source, a first load for atomizing an aerosol source or heating a flavor source, and a second load different from the first load are electrically connected; a control unit configured so as to acquire a request for supply of power to each of the first load and the second load, and so as to control the circuit so that power is supplied from the power supply to each of the first load and the second load on the basis of the request; and a reducing means configured so that, when the control unit simultaneously acquires the request to the first load and the request to the second load, or when the control unit controls the circuit so that the supply of power to the first load and the supply of power to the second load are performed simultaneously, the electric power discharged from the power supply or the electric power amount is reduced to less than a maximum electric power for when the power supply discharges to the first load and the second load simultaneously or a maximum electric power amount.

6 Claims, 17 Drawing Sheets

(58) Field of Classification Search
CPC .............. H02J 7/0063; H01M 10/425; H01M 2220/30; Y02E 60/10
USPC ......................................................... 131/329
See application file for complete search history.

(56) References Cited

U.S. PATENT DOCUMENTS

| | | | | |
|---|---|---|---|---|
| 10,050,437 | B2* | 8/2018 | Nomoto | H01M 10/441 |
| 10,456,188 | B2* | 10/2019 | Takami | A61B 18/10 |
| 2009/0095311 | A1* | 4/2009 | Han | H05B 3/06 |
| | | | | 131/194 |
| 2009/0322287 | A1* | 12/2009 | Ozeki | H02J 7/0018 |
| | | | | 320/145 |
| 2014/0000638 | A1* | 1/2014 | Sebastian | A24F 40/50 |
| | | | | 131/328 |
| 2014/0338680 | A1* | 11/2014 | Abramov | A24F 40/46 |
| | | | | 131/328 |
| 2014/0348495 | A1* | 11/2014 | Greim | A24F 40/40 |
| | | | | 392/386 |
| 2014/0375117 | A1* | 12/2014 | Kaupert | H01M 10/46 |
| | | | | 307/46 |
| 2015/0122274 | A1* | 5/2015 | Cohen | A24F 40/40 |
| | | | | 131/328 |
| 2015/0216236 | A1* | 8/2015 | Bless | B23K 26/20 |
| | | | | 131/328 |
| 2015/0223868 | A1* | 8/2015 | Brandt | A61B 18/1445 |
| | | | | 606/40 |
| 2015/0245669 | A1* | 9/2015 | Cadieux | A24F 40/50 |
| | | | | 131/329 |
| 2016/0331032 | A1* | 11/2016 | Malgat | A24D 1/20 |
| 2017/0055587 | A1* | 3/2017 | Zinovik | A24F 40/53 |
| 2017/0079330 | A1* | 3/2017 | Mironov | H05B 6/108 |
| 2017/0086508 | A1* | 3/2017 | Mironov | A24F 40/46 |
| 2017/0105452 | A1* | 4/2017 | Mironov | A24F 40/465 |
| 2017/0231276 | A1* | 8/2017 | Mironov | H05B 1/0244 |
| | | | | 131/328 |
| 2017/0231277 | A1* | 8/2017 | Mironov | A24F 40/40 |
| | | | | 392/404 |
| 2017/0231278 | A1* | 8/2017 | Mironov | G01F 23/26 |
| | | | | 392/390 |
| 2018/0177238 | A1* | 6/2018 | Bessant | G01C 9/18 |
| 2018/0192700 | A1* | 7/2018 | Fraser | A24F 40/44 |
| 2018/0213843 | A1* | 8/2018 | Mironov | A61M 15/06 |
| 2018/0219373 | A1* | 8/2018 | Hart | H02J 1/14 |
| 2018/0242644 | A1* | 8/2018 | Bessant | H05B 3/34 |
| 2019/0313695 | A1* | 10/2019 | Kaufman | A24B 15/167 |

FOREIGN PATENT DOCUMENTS

| | | |
|---|---|---|
| JP | 2009-063843 A | 3/2009 |
| JP | 2010-506594 A | 3/2010 |
| JP | 2011-147285 A | 7/2011 |
| JP | 2014-525251 A | 9/2014 |
| JP | 2015-521847 A | 8/2015 |
| JP | 2015-204833 A | 11/2015 |
| WO | 2008/108889 A1 | 9/2008 |
| WO | 2017/001819 A1 | 1/2017 |
| WO | 2017/002449 A1 | 1/2017 |
| WO | 2017/085240 A1 | 5/2017 |
| WO | 2018/073376 A1 | 4/2018 |
| WO | 2018/158207 A1 | 9/2018 |

OTHER PUBLICATIONS

Office Action issued on Dec. 23, 2021, in corresponding Japanese patent Application No. 2021-110487, 5 pages.
Office Action issued on Feb. 21, 2022, in corresponding Japanese patent Application No. 2021-110487.
Extended European Search Report issued Jul. 3, 2023, in corresponding European Patent Application 23162042.8.

* cited by examiner

FLAVOR-GENERATING DEVICE, POWER SUPPLY UNIT, METHOD FOR CONTROLLING FLAVOR-GENERATING DEVICE, AND PROGRAM

CROSS-REFERENCE TO RELATED APPLICATION

The present application is a continuation application of International Application No. PCT/JP2018/034675, filed on Sep. 19, 2018, the entire contents of which are incorporated herein by reference.

TECHNICAL FIELD

The present invention relates to a flavor generating device, an electric power source unit, a method for controlling a flavor generating device, and a program.

BACKGROUND ART

A flavor generating device, which is used in place of a cigarette, for tasting aerosol (a flavor), that is generated by atomizing an aerosol source by using an electric load such as a heater, has been known (Patent Literatures 1-3). An aerosol generating device comprises a heating element for atomizing an aerosol source or heating a flavor source, an electric power source for supplying electric power to the heating element, and a control unit for controlling a load, the electric power source, and so on.

Patent Literature 2 discloses an article for smoking which comprises a first electric-resistance heating element which receives electric power from an electric power source and heats air sucked via an opening positioned on a distal end of an outside housing, and a second electric-resistance heating element which receives electric power from the electric power source and heats an aerosol forming material and a tobacco material.

Patent Literature 3 discloses a smoking material heating device which comprises plural heating cylinders for heating a smoking material. The above cylinders are electrically driven by electric power.

CITATION LIST

Patent Literature

PTL 1: Japanese Patent Application Public Disclosure No. 2015-204833
PTL 2: Japanese Patent Application Public Disclosure No. 2010-506594
PTL 3: Japanese Patent Application Public Disclosure No. 2014-525251

SUMMARY OF INVENTION

A first feature comprises a flavor generating device, and the gist thereof is that the flavor generating device comprises: a circuit for electrically connecting an electric power source, a first load for atomizing an aerosol source or heating a flavor source, and a second load which is different from the first load; a control unit configured to obtain respective requests for supply of electric power to the first load and the second load, and control the circuit to supply electric power from the electric power source to the first load and the second load, respectively, based on the respective requests; and a reducing means configured to reduce electric power or electric energy discharged from the electric power source, when the control unit has obtained the request with respect to the first load and the request with respect to the second load in the same period of time, or when the control unit controls the circuit to perform supply of electric power to the first load and supply of electric power to the second load in the same period of time, to that less than maximum electric power or maximum electric energy that is discharged in the case that the electric power source performs discharge to the first load and discharge to the second load at the same time.

A second feature comprises the flavor generating device in the first feature, and the gist thereof is that the reducing means is configured in such a manner that electric power is not supplied from the electric power source to the first load and the second load at the same time.

A third feature comprises the flavor generating device in the first feature or the second feature, and the gist thereof is that the circuit comprises a first switch for opening/closing electric connection between the first load and the electric power source and a second switch for opening/closing electric connection between the second load and the electric power source; a switching cycle of the first switch and a switching cycle of the second switch are the same with each other; and the reducing means is configured to set or correct at least one of an ON period of the first switch and an ON period of the second switch in such a manner that a sum of the ON period of the first switch and the ON period of the second switch does not exceed the switching cycle.

A fourth feature comprises the flavor generating device in the third feature, and the gist thereof is that the reducing means is configured to shift a phase of switching of the first switch, by a period of time equal to or longer than the ON period of the second switch, from a phase of switching of the second switch, or shift a phase of switching of the second switch, by a period of time equal to or longer than the ON period of the first switch, from a phase of switching of the first switch.

A fifth feature comprises the flavor generating device in the third feature or the fourth feature, and the gist thereof is that the reducing means is configured to set or correct at least one of an ON period of the first switch and an ON period of the second switch in such a manner that a sum of the ON period of the first switch and the ON period of the second switch becomes a period of time less than the switching cycle, and shift a phase of switching of the first switch, by a period of time much longer than the ON period of the second switch, from a phase of switching of the second switch, or shift a phase of switching of the second switch, by a period of time much longer than the ON period of the first switch, from a phase of switching of the first switch.

A sixth feature comprises the flavor generating device in the first feature, and the gist thereof is that the circuit comprises a first switch for opening/closing electric connection between the first load and the electric power source and a second switch for opening/closing electric connection between the second load and the electric power source; and the reducing means is configured to set or correct at least one of a variable or a mode relating to switching control of the first switch and a variable or a mode relating to switching control of the second switch, to reduce electric power or electric energy discharged from the electric power source.

A seventh feature comprises the flavor generating device in the sixth feature, and the gist thereof is that the reducing means is configured to shorten at least one of an ON period of the first switch and an ON period of the second switch.

An eighth feature comprises the flavor generating device in the sixth feature, and the gist thereof is that the reducing means is configured to shorten at least one of a switching cycle of the first switch and a switching cycle of the second switch.

A ninth feature comprises the flavor generating device in the sixth feature or the eighth feature, and the gist thereof is that the control unit is configured to be able to control the first switch and the second switch based on feedback control that uses PWM control, and the reducing means is configured to control at least one of the first switch and the second switch based on feedback control that uses PFM control instead of the PWM control.

A tenth feature comprises the flavor generating device in one of the first feature and the sixth feature to the ninth feature, and the gist thereof is that the reducing means is configured to reduce electric power supplied to the second load that is supplied at the same time when electric power is supplied to the first load, or reduce electric power supplied to the first load that is supplied at the same time when electric power is supplied to the second load.

An eleventh feature comprises the flavor generating device in the tenth feature, and the gist thereof is that the control unit is configured to control, based on feedback control, electric power supplied from the electric power source to at least one of the first load and the second load, and the reducing means is configured to adjust at least one of a limiter's upper-limit and proportional gain in the feedback control, to reduce electric power supplied from the electric power source to at least one of the first load and the second load.

A twelfth feature comprises the flavor generating device in the tenth feature, and the gist thereof is that the circuit comprises a regulator for adjusting current outputted to at least one of the first load and the second load, and the reducing means is configured to control the regulator to reduce a value of current outputted from the regulator.

A thirteenth feature comprises the flavor generating device in one of the first feature to the eleventh feature, and the gist thereof is that the circuit comprises a first circuit and a second circuit which is connected in parallel with the first circuit and has an electric resistance value higher than that of the first circuit, and the reducing means is configured to activate the second circuit without activating the first circuit.

A fourteenth feature comprises the flavor generating device in one of the first feature to the thirteenth feature, and the gist thereof is that the reducing means comprises a protection integrated circuit or an electrical fuse which is positioned in the circuit and has a rated current value that is larger than a value of maximum current that can be supplied to one of the first load and the second load.

A fifteenth feature comprises the flavor generating device in the fourteenth feature, and the gist thereof is that the reducing means is configured to control the circuit in such a manner that a sum of first current, that is supplied to the first load, and second current, that is supplied to the second load at the same time when the first current is supplied to the first load, does not exceed the rated current value.

A sixteenth feature comprises the flavor generating device in one of the first feature to the fifteenth feature, and the gist thereof is that the reducing means comprises a thermal fuse which is positioned in the circuit and has a rated current value that is equal to or less than half of a value of current that flows when electric power is supplied to the first load and the second load at the same time.

A seventeenth feature comprises the flavor generating device in one of the first feature to the fifteenth feature, and the gist thereof is that the reducing means comprises an auxiliary electric power source which can perform discharge to the first load and the second load.

An eighteenth feature comprises the flavor generating device in the seventeenth feature, and the gist thereof is that the auxiliary electric power source has power density higher than that of the electric power source.

A nineteenth feature comprises the flavor generating device in the seventeenth feature or the eighteenth feature, and the gist thereof is that the control unit or the reducing means is able to obtain a value relating to a remaining quantity of the auxiliary electric power source, and the control unit or the reducing means is configured to control the circuit in such a manner that electric power or electric energy discharged from the electric power source is reduced as the value relating to the remaining quantity of the auxiliary electric power source becomes larger.

A twentieth feature comprises the flavor generating device in one of the first feature to the nineteenth feature, and the gist thereof is that the electric power source and the auxiliary electric power source are connected in parallel with at least one of the first load and the second load, and the circuit comprises a converter which is positioned between the electric power source and the auxiliary electric power source and is able to convert the magnitude of at least one of inputted current, an inputted voltage, and inputted electric power and output it/them.

A twenty-first feature comprises an electric power unit for a flavor generating device, and the gist thereof is that the electric power unit comprises: an electric power source; a circuit for electrically connecting a first load for atomizing an aerosol source or heating a flavor source and a second load, which is different from the first load, to the electric power source; a control unit configured to obtain respective requests for supply of electric power to the first load and the second load, and control the circuit to supply electric power from the electric power source to the first load and the second load, respectively, based on the respective requests; and a reducing means configured to reduce electric power or electric energy discharged from the electric power source, when the control unit has obtained the request with respect to the first load and the request with respect to the second load in the same period of time, or when the control unit controls the circuit to perform supply of electric power to the first load and supply of electric power to the second load in the same period of time, to that less than maximum electric power or maximum electric energy that is discharged in the case that the electric power source performs discharge to the first load and discharge to the second load at the same time.

A twenty-second feature comprises a method for controlling a flavor generating device comprising a first load for atomizing an aerosol source or heating a flavor source and a second load which is different from the first load, and the gist thereof is that the method comprises: a step for obtaining respective requests for supply of electric power to the first load and the second load, and controlling a circuit to supply electric power from the electric power source to the first load and the second load, respectively, based on the respective requests; and a step for reducing electric power or electric energy discharged from the electric power source, when the request with respect to the first load and the request with respect to the second load are obtained in the same period of time, or when the circuit is controlled to perform supply of electric power to the first load and supply of electric power to the second load in the same period of time, to that less than maximum electric power or maximum electric energy that is discharged in the case that the electric power source performs discharge to the first load and discharge to the second load at the same time.

The gist of a twenty-third feature comprises a program which makes a flavor generating device perform the method in the twenty-second feature.

DESCRIPTION OF EMBODIMENTS

Figure 1:
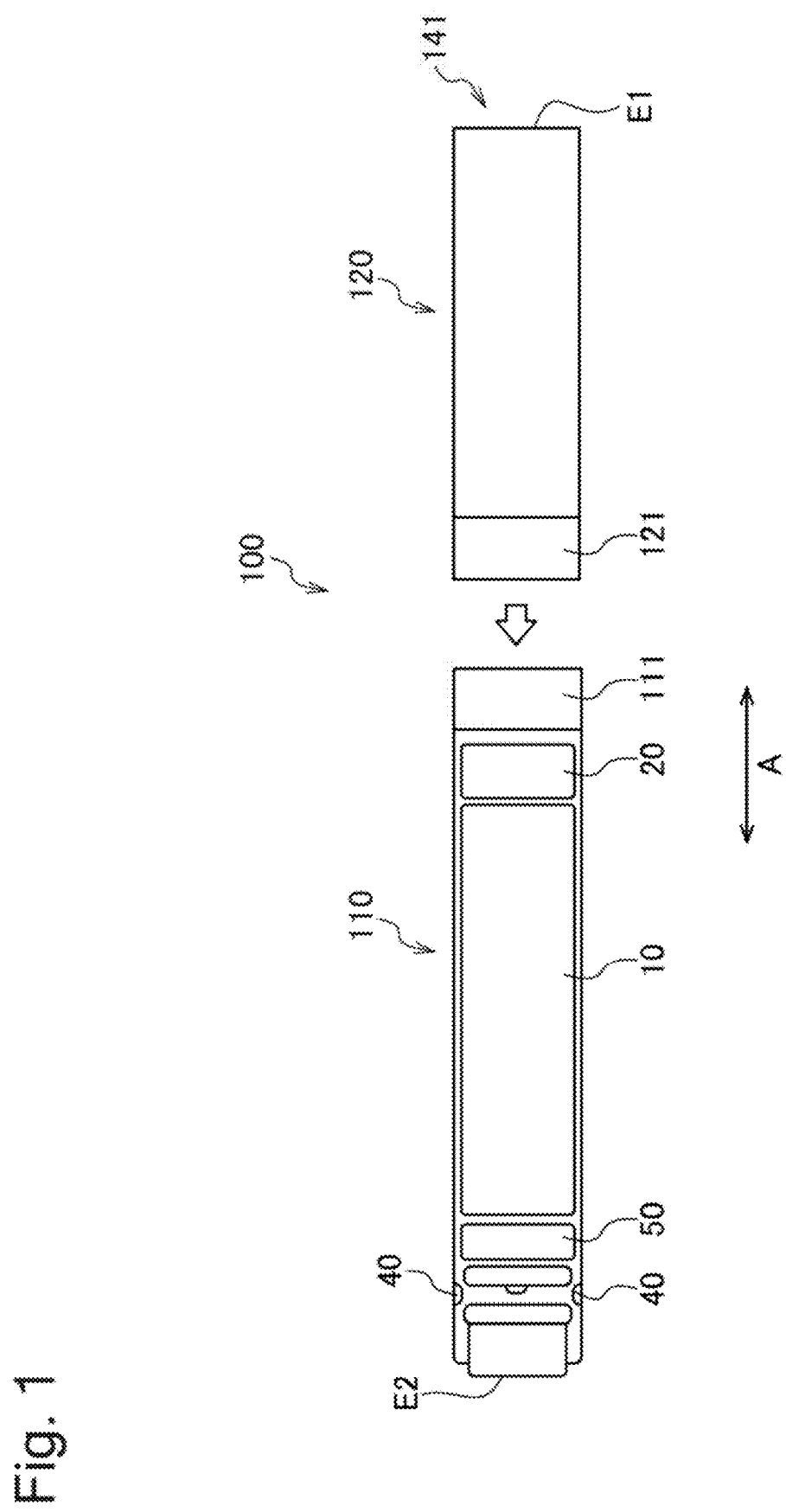
FIG. 1 is a schematic diagram of a flavor generating device according to an embodiment.

In the following description, embodiments will be explained. Note that, in the descriptions in the following figures, the same or similar reference symbols are assigned to the same or similar parts. In this regard, it should be reminded that the figures are drawn in a schematic manner, and ratios between respective sizes therein may be different from those in actual embodiments.

Thus, tangible sizes and so on are those that should be determined by taking the following description into consideration. Further, although it is a matter of course, there may be a case that relationship, ratios, and so on between sizes in part of a figure are different from those in parts of other figures.

Summary of Disclosure

In each of the devices disclosed in Patent Literature 2 and Patent Literature 3, electric power from an electric power source may be supplied to plural electric loads such as two or more electric heating elements. The inventors of the subject application have considered operation for driving each load alone and operation for driving plural loads in the same period of time, in a flavor generating device comprising plural loads. In the above case, for independently control the respective loads, the plural loads may be electrically connected in parallel, in relation to an electric power source. In the case that plural loads are electrically connected in parallel in relation to an electric power source, a combined electric resistance value of plural loads becomes smaller than an electric resistance value of each load. Thus, in the case that electric power is supplied from an electric power source to plural loads at the same time, current larger than that outputted when electric power is supplied from the electric power source to a single load is outputted from the electric power source.

Further, it has been known that deterioration of an electric power source progresses as electric power and current discharged per unit time increases.

Accordingly, in the case that plural loads are driven in the same period of time, the quantity of discharge becomes relatively large, so that the remaining quantity of the electric power source may decrease steeply, and/or deterioration of the electric power source may tend to progress faster. Thus, even in a case such as that explained above, it is preferable that steep decrease of the remaining quantity of an electric power source and/or tendency to accelerate progress of deterioration of the electric power source be suppressed.

According to an embodiment, a flavor generating device comprises: a circuit for electrically connecting an electric power source, a first load for atomizing an aerosol source or heating a flavor source, and a second load which is different from the first load; a control unit constructed to obtain respective requests for supply of electric power to the first load and the second load, and control the circuit to supply electric power from the electric power source to the first load and the second load, respectively, based on the respective requests; and a reducing means constructed to reduce electric power or electric energy discharged from the electric power source, when the control unit has obtained the request with respect to the first load and the request with respect to the second load in the same period of time, or when the control unit controls the circuit to perform supply of electric power to the first load and supply of electric power to the second load in the same period of time, to that less than maximum electric power or maximum electric energy discharged in the case that the electric power source performs discharge to the first load and discharge to the second load at the same time.

According to an embodiment, an electric power unit comprises: an electric power source; a circuit for electrically connecting a first load for atomizing an aerosol source or heating a flavor source and a second load, which is different from the first load, to the electric power source; a control unit constructed to obtain respective requests for supply of electric power to the first load and the second load, and control the circuit to supply electric power from the electric power source to the first load and the second load, respectively, based on the respective requests; and a reducing means constructed to reduce electric power or electric energy discharged from the electric power source, when the control unit has obtained the request with respect to the first load and the request with respect to the second load in the same period of time, or when the control unit controls the circuit to perform supply of electric power to the first load and supply of electric power to the second load in the same period of time, to that less than maximum electric power or maximum electric energy discharged in the case that the electric power source performs discharge to the first load and discharge to the second load at the same time.

According to each of the above embodiments, electric power or electric energy discharged from the electric power source is reduced, when a request with respect to the first load and a request with respect to the second load are obtained in the same period of time, or when the circuit is controlled to supply electric power to the first load and supply electric power to the second load in the same period of time. Thus, even in a case such as that explained above, the quantity of discharge from the electric power source is reduced, so that steep decrease of the remaining quantity of the electric power source and/or tendency to accelerate progress of deterioration of the electric power source can be suppressed.

Flavor Generating Device

Figure 2:
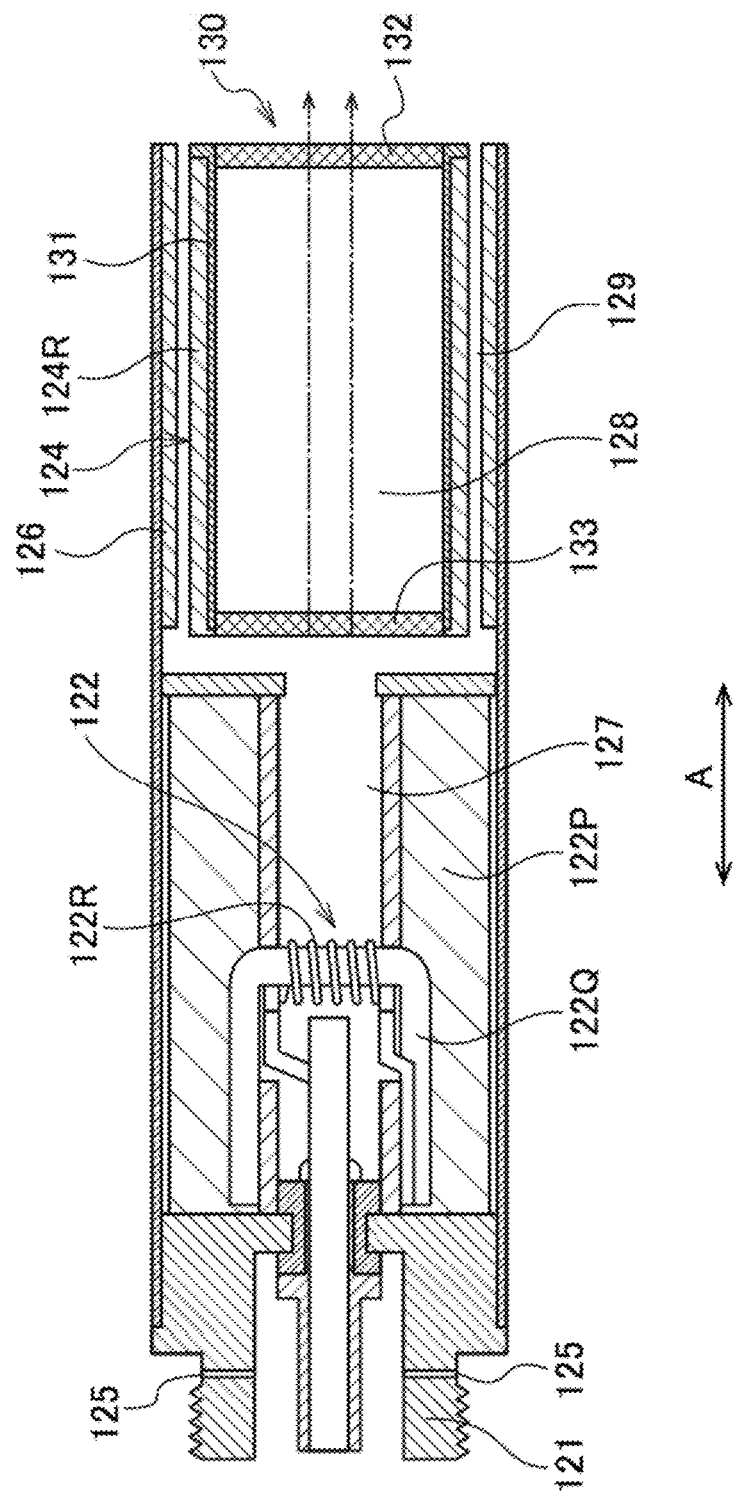
FIG. 2 is a schematic diagram of an atomizing unit according to an embodiment.
Figure 3:
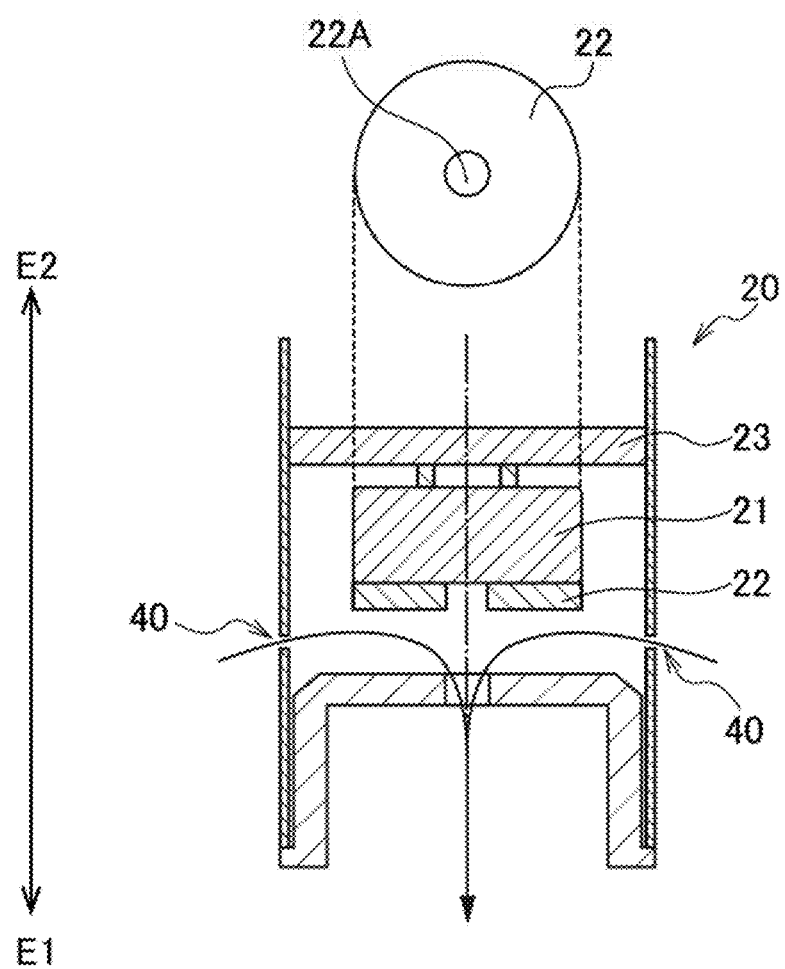
FIG. 3 is a schematic diagram showing an example of a construction of an inhalation sensor according to an embodiment.
Figure 4:
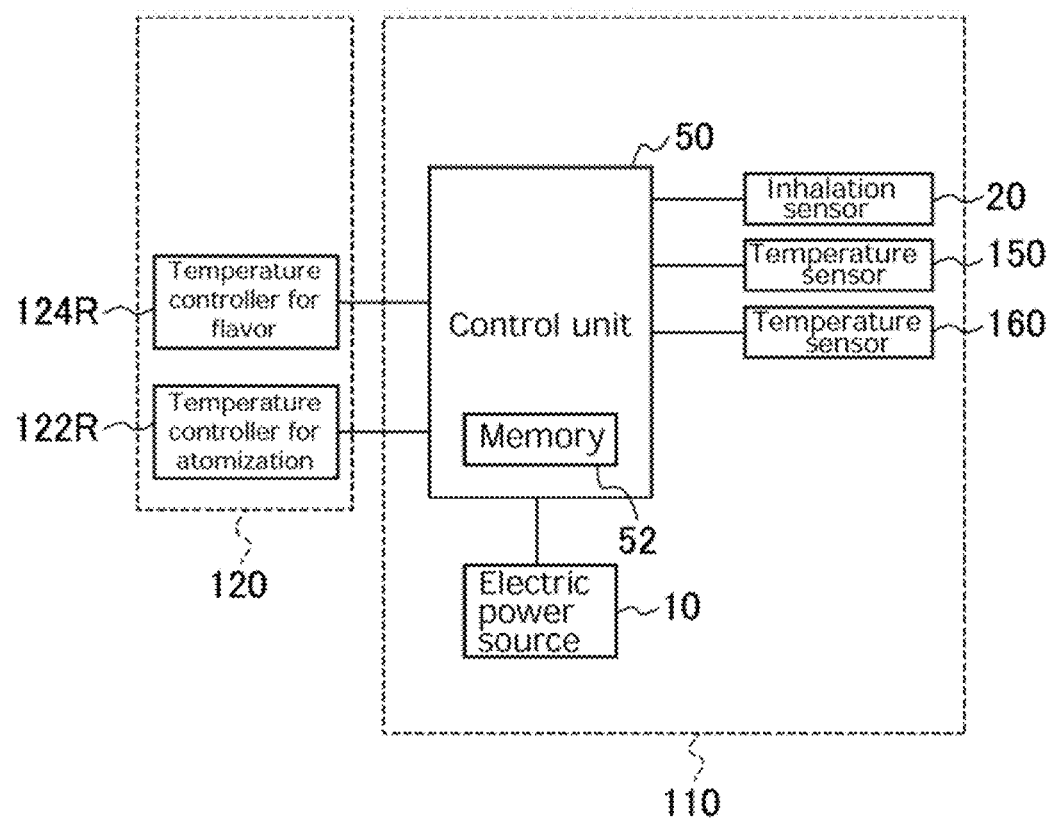
FIG. 4 is a block diagram of a flavor generating device.

In the following description, a flavor generating device according to an embodiment will be explained. FIG. 1 is an exploded view showing a flavor generating device according to an embodiment. FIG. 2 is a schematic diagram of an atomizing unit according to an embodiment. FIG. 3 is a schematic diagram showing an example of a construction of an inhalation sensor according to an embodiment. FIG. 4 is a block diagram of the flavor generating device.

A flavor generating device 100 may be a non-burning-type flavor inhaler for inhaling a flavor without a burning process. Preferably, the flavor generating device 100 may be a portable flavor inhaler. The flavor generating device 100 may have a shape that extends in a predetermined direction A that is a direction from a non-suction-opening end E2 to a suction-opening end E1. In this case, the flavor generating device 100 may comprise an end E1 which comprises a suction opening 141 for inhaling a flavor and the other end E2 positioned opposite to the suction opening 141.

The flavor generating device 100 may comprise an electric power source unit 110 and an atomizing unit 120. The atomizing unit 120 may be constructed to be attachable/detachable to/from the electric power source unit 110 via mechanical connection parts 111 and 121. When the atomizing unit 120 and the electric power source unit 110 are mechanically connected with each other, an electric load 122R for atomization and an electric load 124R for flavor, which will be explained later, in the atomizing unit 120 are electrically connected to an electric power source 10 positioned in the electric power source unit 110.

The atomizing unit 120 comprises an aerosol source (a flavor component source) which is inhaled, when it is in an atomized state, by a user, and the atomization electric load 122R for atomizing the aerosol source by using electric power from the electric power source 10.

The atomization electric load 122R can be any element which can adjust the quantity of aerosol (the quantity of flavor components) generated from the aerosol source, according to supplied electric power. For example, the atomization electric load 122R may be an atomization temperature regulator 122 which can adjust temperature of the aerosol source. For example, the atomization electric load 122R comprising the atomization temperature regulator 122 may be a resistance heating element. It will be obvious to a person skilled in the art that the quantity of aerosol generated from the aerosol source changes according to the temperature of the aerosol source.

In the following description, a more detailed example of the atomizing unit 120 will be explained with reference to FIG. 1 and FIG. 2. The atomizing unit 120 may comprise a reservoir 122P, a wick 122Q, and the atomization electric load 122R. The reservoir 122P may be constructed to store an aerosol source in a liquid form. For example, reservoir 122P may be a porous body constructed by use of material such as a resin web or the like. The wick 122Q may be a liquid holding member for sending the aerosol source from the reservoir 122P to a position near the atomization electric load 122R by using a capillary phenomenon. For example, the wick 122Q may be constructed by use of a glass fiber, a porous ceramic, or the like.

The atomization electric load 122R heats the aerosol source held in the wick 122Q. The atomization electric load 122R is constructed, for example, by use of a resistance heating element (for example, a heating wire) which is wound around the wick 122Q.

For example, the atomization electric load 122R may be a temperature regulator 122 such as an electric heater. Alternatively, the atomization electric load 122R may be a temperature regulator which has a function for heating and cooling an aerosol source held in the wick 122Q.

The air taken from an inlet 125 and flowing through a flow path 127 passes through a space near the atomization electric load 122R in the atomizing unit 120. The aerosol generated in the position of the atomization electric load 122R flows toward the suction opening 141 together with the taken air. In this regard, the inlet 125 may be formed in at least one of the electric power source unit 110 and the atomizing unit 120.

The aerosol source may be liquid at normal temperature. For example, polyhydric alcohol such as glycerin, propylene glycol, or the like may be used as the aerosol source. The aerosol source may comprise a tobacco raw material or an extract originated from a tobacco raw material, which releases a fragrance-inhaling-taste component when it is heated.

An example in which the aerosol source is liquid at normal temperature has been explained in detail; however, in place of the above aerosol source, an aerosol source which is solid at normal temperature may be used. In such a case, the atomization electric load 122R may be positioned to be in contact with or to be close to a solid aerosol source, for generating aerosol from the solid aerosol source.

The atomizing unit 120 may comprise a flavor unit 130 which is constructed to be exchangeable. The flavor unit 130 comprises a cylindrical body 131 for storing a flavor source (an inhaled component source). The cylindrical body 131 may comprise a membrane member 133 and a filter 132 which allow air, aerosol, and so on to pass through them. A flavor source may be arranged in a space formed by the membrane member 133 and the filter 132.

The flavor generating device 100 has flow paths 127 and 128 through which at least part of the aerosol generated from the aerosol source is sent, via a flavor source, to arrive at an outlet. As a result, the flavor source in the flavor unit 130 adds flavor components to the aerosol generated by the atomization electric load 122R in the atomizing unit 120. The flavor components added to the aerosol by the flavor source are conveyed to the suction opening 141 of the flavor generating device 100.

The flavor source in the flavor unit 130 may be solid at normal temperature. For example, the flavor source comprises a raw-material piece of plant material which provides aerosol with a fragrance-inhaling-taste component. Regarding a raw-material piece which is a component of the flavor source, shredded tobacco or a formed body, which is formed by processing tobacco material such as tobacco raw material to have a granular form, may be used as the raw-material piece. Alternatively, the flavor source may comprise a formed body which is formed by processing tobacco material to have a sheet form. Further, the raw-material piece, which is a component of the flavor source, may comprise a plant other than tobacco (for example, mint, a herb, and so on). The flavor source may be provided with flavor such as menthol or the like.

The flavor source may be held in the space formed by the membrane member 133 and the filter 132 in such a manner that the flavor source can flow in the space. In such a case, the flavor source flows in the flavor unit 130 when it is used, so that occurrence of imbalance between parts of the flavor source which are brought in contact with the flavor electric load 124R can be suppressed, and flavor components can be outputted stably.

Alternatively, the flavor source is filled in the space formed by the membrane member 133 and the filter 132, so that the flavor source may be fixed substantially. In such a case, heat can be efficiently conducted from the flavor electric load 124R to the flavor source.

The flavor electric load 124R installed in the atomizing unit 120 may be positioned in a space around the cylindrical body 131 of the flavor unit 130 attached to the atomizing unit 120. The flavor electric load 124R may be constructed to be able to adjust the quantity of flavor (the inhaled components) generated from the flavor source. The flavor electric load 124R may be an element which can adjust the quantity of flavor generated from the flavor source, according to supplied electric power. For example, the flavor electric load 124R may be a temperature regulator 124 which can adjust temperature of the flavor source. The temperature regulator 124 may comprise a resistance heating element. The temperature regulator 124 may comprise an induction heating element. Alternatively, the temperature regulator 124 may comprise a cooling element such as a Peltier element. Further, the temperature regulator 124 may be an element which can implement both a heating function and a cooling function.

A heat insulator 126 may be installed on the outside of the flavor electric load 124R. Then, it becomes possible to prevent a difference between temperature of a periphery of the flavor generating device 100 and outside air temperature from becoming excessively large. That is, it becomes possible to prevent the periphery of the flavor generating device 100 from becoming excessively cold and excessively hot. Further, as a result that the heat insulator 126 is used, the loss in heat transfer from the flavor electric load 124R can be reduced, and temperature can be adjustment in a energy conservation manner.

The flavor generating device 100 may comprise a mouthpiece which has a suction opening for allowing a user to inhale an inhaled component. The mouthpiece 142 may be constructed to be attachable/detachable to/from the atomizing unit 120 or the flavor unit 130, or may be constructed to be integrated with it to be inseparable. Alternatively, a part of the atomizing unit 120 or the flavor unit 130 may function to perform the role of a mouthpiece.

Further, the flavor generating device 100, specifically, the atomizing unit 120, may comprise a first flow path 128 which guides aerosol to the suction opening 141 through the flavor source, and a second flow path 129 which guides aerosol to the suction opening 141 without passing through the flavor source. The aerosol passing through the second flow path 129 arrives at the suction opening 141 without addition of flavor from the flavor unit. In such a case, the atomizing unit 120 may comprise a flow quantity adjusting means, which is not shown in the figures, for adjusting the ratio between the quantity of the flow in the first flow path 128 and the quantity of the flow in the second flow path 129.

The electric power source unit 110 may comprise the electric power source 10 and a control unit 50. The control unit 50 may comprise a memory 52 for storing information required for implementing various types of control that is required for operation of the flavor generating device 100.

The control unit 50 may perform various types of control required for operation of the flavor generating device 100. For example, the control unit 50 obtains respective requests for supply of electric power to the atomization electric load 122R and the flavor electric load 124R, and controls the electric circuit to supply electric power from the electric power source 10 to the atomization electric load 122R and the flavor electric load 124R, respectively, based on the respective requests. As will be explained later, a request for supply of electric power is defined based on an output signal form a push button, an inhalation sensor, or the like.

Further, the control unit 50 may comprise, as necessary, a notification unit for outputting notice to inform a user of various information. For example, the notification unit may be an element which emits light such as an LED, an element which outputs sound, or a vibrator which generates vibration. Alternatively, the notification unit may be constructed to include a combination of elements which generate light, sound, and vibration.

The electric power source 10 stores electric power required for operation of the flavor generating device 100. The electric power source 10 may be attachable/detachable to/from the electric power source unit 110. For example, the electric power source 10 may be a rechargeable battery such as a lithium-ion secondary battery, an electric double layer capacitor, or a combination of them.

The control unit 50 may comprise an inhalation detecting unit for detecting an inhalation request action performed by a user. For example, the inhalation detecting unit may be an inhalation sensor 20 for detecting an inhalation action of a user. Alternatively, for example, the inhalation detecting unit may be a push button that is to be pushed by a user.

The control unit 50 generates an instruction for activating the atomization electric load 122R and/or the flavor electric load 124R, when the inhalation detecting unit has detected an inhalation request action. The control unit 50 may be constructed to control electric power supplied to the atomization electric load 122R and the flavor electric load 124R to vary, according to a mode selected by a user, an environment, or the like.

When the inhalation detecting unit has detected an inhalation request action, it is preferable that the control unit 50 supply electric power, in the form of electric power pulses, from the electric power source 10 to the atomization electric load 122R and/or the flavor electric load 124R. Then, the control unit 50 can control electric power supplied to the atomization electric load 122R and/or the flavor electric load 124R, by adjusting a duty ratio of pulse width modulation (PWM) or pulse frequency modulation (PFM).

The flavor generating device 100 may comprise, as necessary, a first temperature sensor 150 which can estimate or obtain temperature of the atomization electric load 122R, and a second temperature sensor 160 which can estimate or obtain temperature of the flavor electric load 124R. For example, each of the first temperature sensor 150 and the second temperature sensor 160 may comprise a thermistor or a thermocouple.

The inhalation sensor 20 may be constructed to output an output value that changes according to inhalation from the suction opening. Specifically, the inhalation sensor 20 may be a sensor for outputting a value (for example, a voltage value or a current value) that changes according to the quantity of the flow of air that is sucked in the direction from the non-suction-opening side to the suction-opening side (that is, a puff action performed by a user). Examples of such sensors that can be listed are a condenser microphone sensor, a publicly known flow sensor, and so on.

FIG. 3 shows a tangible example of the inhalation sensor 20. The inhalation sensor 20 illustrated in FIG. 3 comprises a sensor main body 21, a cover 22, and a circuit board 23. The sensor main body 21 comprises a capacitor, for example. The electric capacitance of the sensor main body 21 changes according to vibration (pressure) generated by air sucked from an inlet 125 (that is, the air sucked in the direction from the non-suction-opening side to the suction-opening side). The cover 22 is installed on the sensor main body 21 at the mouthpiece side thereof, and has an opening 40. By installing the cover 22 having the opening 40, the electric capacitance of the sensor main body 21 is made to be more easily changeable, so that the response characteristic of the sensor main body 21 is improved. The circuit board 23 outputs a value (in this case, a voltage value) representing the electric capacitance of the sensor main body 21 (the capacitor).

First Embodiment

Figure 5:
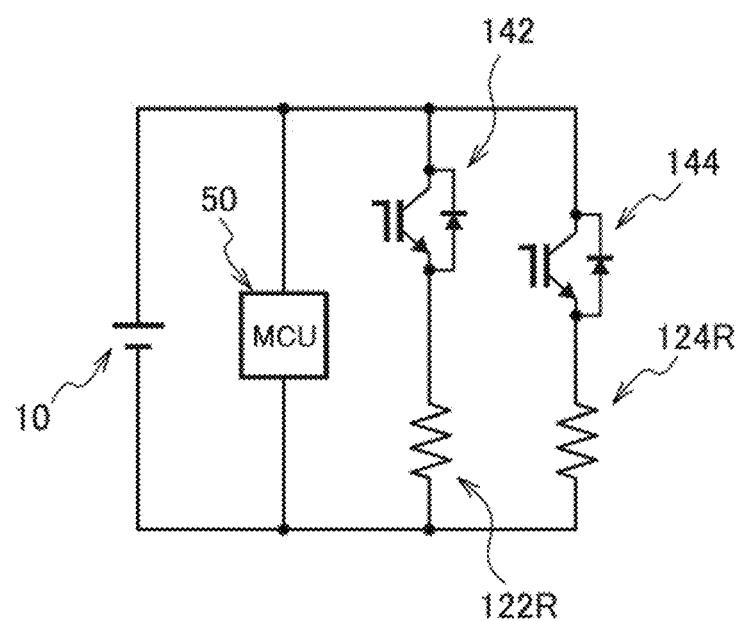
FIG. 5 is a schematic diagram of a flavor generating device which comprises an atomizing unit and an electric power source unit.

FIG. 5 is a schematic diagram of an electric circuit of the flavor generating device 100 which comprises the atomizing unit 120 and the electric power source unit 110. It should be reminded that, in FIG. 5, the construction of the electric circuit is schematically shown for convenience for explaining control of the atomization electric load 122R and the flavor electric load 124R by the control unit 50.

When the atomizing unit 120 is connected to the electric power source unit 110, the atomization electric load 122R (a first load) and the flavor electric load 124R (a second load) are electrically connected to the electric power source 10 in the electric power source unit 110. The atomization electric load 122R (a first load) and the flavor electric load 124R (a second load) may be connected in parallel with each other, in relation to the electric power source 10.

The flavor generating device 100 may comprise a first switch 142 for opening/closing electric connection between the atomization electric load 122R and the electric power source 10, and a second switch 144 for opening/closing electric connection between the flavor electric load 124R and the electric power source 10. The first switch 142 and the second switch 144 may be connected in parallel with each other, in relation to the electric power source 10.

The first switch 142 and the second switch 144 are opened/closed by the control unit 50. For example, each of the first switch 142 and the second switch 144 may comprise a MOSFET. In this regard, elements used in the first switch 142 and the second switch 144 are not limited to MOSFETs, and they may be any of various elements which can open/close electric connection between the first switch 142 and the electric power source 10 and electric connection between the second switch 144 and the electric power source 10, respectively. In the other example, the first switch 142 and the second switch 144 may be constructed by using conductors, for example.

When the first switch 142 is closed (an ON state), electric power is supplied from the electric power source 10 to the atomization electric load 122R. When the second switch 144 is closed (an ON state), electric power is supplied from the electric power source 10 to the flavor electric load 124R. When both the first switch 142 and the second switch 144 are closed (ON states), electric power can be supplied from the electric power source 10 to the atomization electric load 122R and the flavor electric load 124R at the same time.

Figure 6:
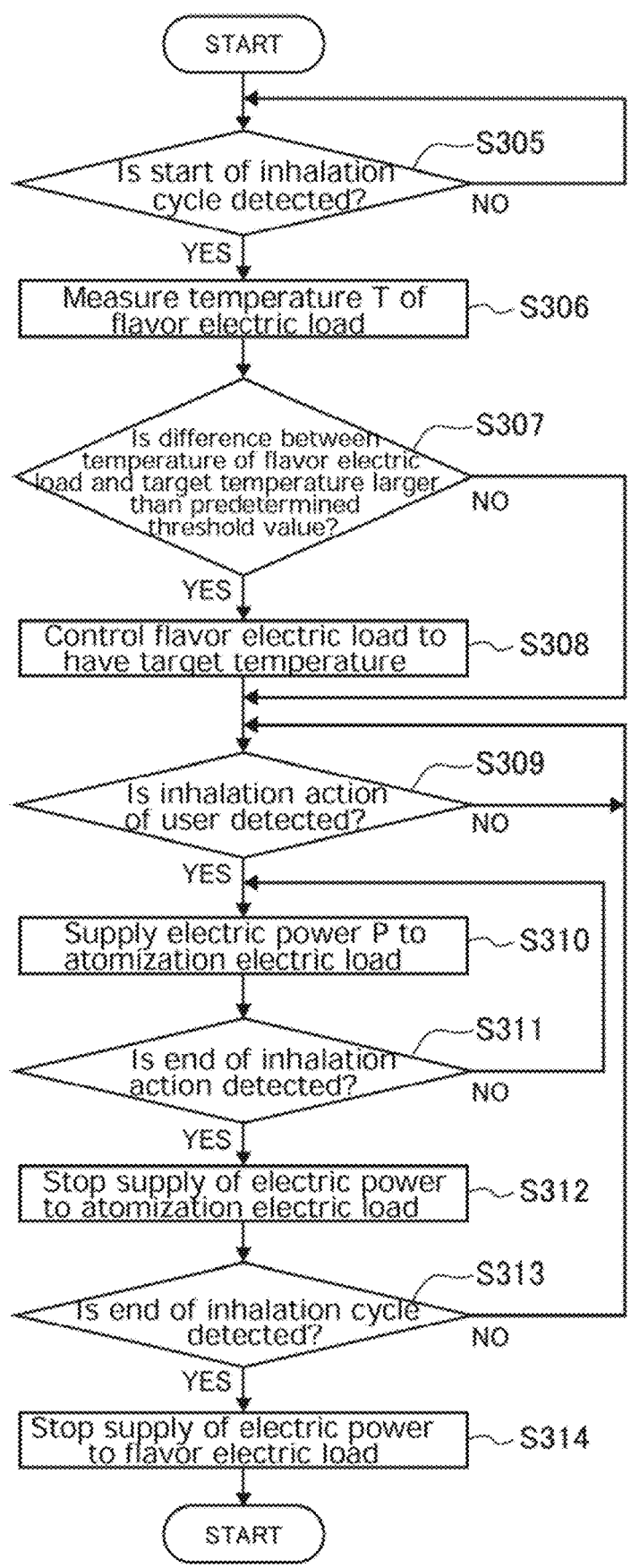
FIG. 6 is a flow chart showing control performed by a control unit according to an embodiment.

FIG. 6 is a flow chart showing an example of control performed by the control unit 50 according to an embodiment.

When the control unit 50 has detected a start of an inhalation cycle, it measures or estimates temperature of the flavor electric load 124R (step S305 and step S306). For example, the inhalation cycle can be detected when a push button is pushed by a user, or the like. In this regard, the inhalation cycle is a cycle in a state that electric power can be supplied to the atomization electric load 122R and/or the flavor electric load 124R as a result of an inhalation action by a user, and may include a single inhalation action or plural inhalation actions performed by the user. Further, the inhalation action means an action such as pushing of a push button by a user, an action such as inhalation from a suction opening, or the like.

The temperature of the flavor electric load 124R may be estimated or measured by the second temperature sensor 160, for example. Alternatively, the flavor electric load 124R may be constructed by use of a PCT (Positive Temperature Coefficient) heater which has a positive temperature coefficient, and the control unit 50 may estimate the temperature of the flavor electric load 124R by measuring or estimating an electric resistance value of the flavor electric load 124R. It should be reminded that the flavor electric load 124R may be constructed by using an NTC heater having a negative temperature coefficient, instead of a PCT heater. This is because, depending on temperature, the electric resistance value of the flavor electric load 124R changes. In this regard, the electric resistance value of the flavor electric load 124R can be estimated by measuring, by a voltage sensor, the quantity of voltage drop in the flavor electric load 124R.

Next, the control unit 50 judges whether a difference (an absolute value of the difference) between the temperature of the flavor electric load 124R and target temperature is larger than a predetermined threshold value (step S307). If the difference (the absolute value of the difference) between the temperature of the flavor electric load 124R and the target temperature is larger than the predetermined threshold value, the control unit 50 adjusts electric power supplied to the flavor electric load 124R to control the flavor electric load 124R to maintain its temperature to be that around the target temperature (step S308). The predetermined threshold value is a permissible value of an error in temperature, and may be set to a value in a range from several degrees Celsius to less than 10 degrees Celsius, for example.

Electric power to the flavor electric load 124R may be supplied in the form of an electric power pulse. In such a case, the temperature of the flavor electric load 124R may be adjusted by adjusting a duty ratio in pulse width modulation (PWM) or pulse frequency modulation (PFM). Specifically, the temperature adjustment of the flavor electric load 124R may be implemented by adjusting a duty ratio in pulse width modulation (PWM) or pulse frequency modulation (PFM) by feedback control, for example.

Further, in the case that the difference (the absolute value of the difference) between the temperature of the flavor electric load 124R and the target temperature is equal to or less than the predetermined threshold value, it is not necessary to perform control of electric power to the flavor electric load 124R. In the case that PWM is used, supply of electric power to the flavor electric load 124R is stopped by adjusting the duty ratio to 0%.

The control unit 50 monitors presence of an inhalation action of a user during controlling the flavor electric load 124R (step S309). The inhalation action of the user may be detected by using the above-explained inhalation sensor 20.

When the control unit 50 has detected an inhalation action of a user, it supplies electric power to the atomization electric load 122R and heats the atomization electric load 122R (step S310). As a result, aerosol is generated from the atomizing unit 120. Flavor is added to at least part of the aerosol generated in the atomizing unit 120 by making it pass through the flavor source. Thus, a user inhales aerosol to which flavor has been added.

Electric power to the atomization electric load 122R may be supplied in the form of an electric power pulse. In such a case, the temperature of the atomization electric load 122R may be adjusted by adjusting a duty ratio in pulse width modulation (PWM) or pulse frequency modulation (PFM). Specifically, the temperature adjustment of the atomization electric load 122R may be implemented by adjusting a duty ratio in pulse width modulation (PWM) or pulse frequency modulation (PFM) by feedback control, for example. In the other example, it may be implemented by adjusting a duty ratio in pulse width modulation (PWM) or pulse frequency modulation (PFM) by feedforward control. Alternatively, it may be possible to implement constant power control, by increasing the duty ratio in response to decrease in the output voltage of the electric power source 10.

When the control unit 50 has detected an end of an inhalation action (step S311), it stops supply of electric power to the atomization electric load 122R (step S312). In this regard, the end of the inhalation action may be detected by the inhalation sensor 20.

Further, the control unit 50 may stop supply of electric power to the atomization electric load 122R at timing different from the timing of detection of the end of the inhalation action. For example, in the case that a user continues an inhalation action for a very long time, or abnormality in the atomization electric load 122R and/or the electric power source 10 is detected, supply of electric power to the atomization electric load 122R may be stopped.

When the control unit 50 has detected an end of an inhalation cycle (step S313), it may stop supply of electric power to the flavor electric load 124R (step S314). For example, the control unit 50 may judge that an inhalation cycle is completed, when a predetermined push button is pushed by a user, or when a predetermined period of time has elapsed since the end of the last inhalation action. Alternatively, the control unit 50 may judge that an inhalation cycle is completed, when a predetermined number of times of inhalation actions are detected during a single inhalation cycle, or when a predetermined period of time has elapsed since the start of an inhalation cycle.

In the above-explained control flow, timing of the start and timing of the end of supply of electric power to the atomization electric load 122R are different from those with respect to the flavor electric load 124R. In the above case, electric power may be suppled from the electric power source 10 to the atomization electric load 122R and the flavor electric load 124R at the same time during the period between step S308 and step S312. Alternatively, timing of the start and/or timing of the end of supply of electric power to the atomization electric load 122R may be set to be the same as those/that with respect to the flavor electric load 124R. In such a case, electric power may be suppled from the electric power source 10 to the atomization electric load 122R and the flavor electric load 124R at the same time during the period from the start to the end of the inhalation cycle.

Figure 7:
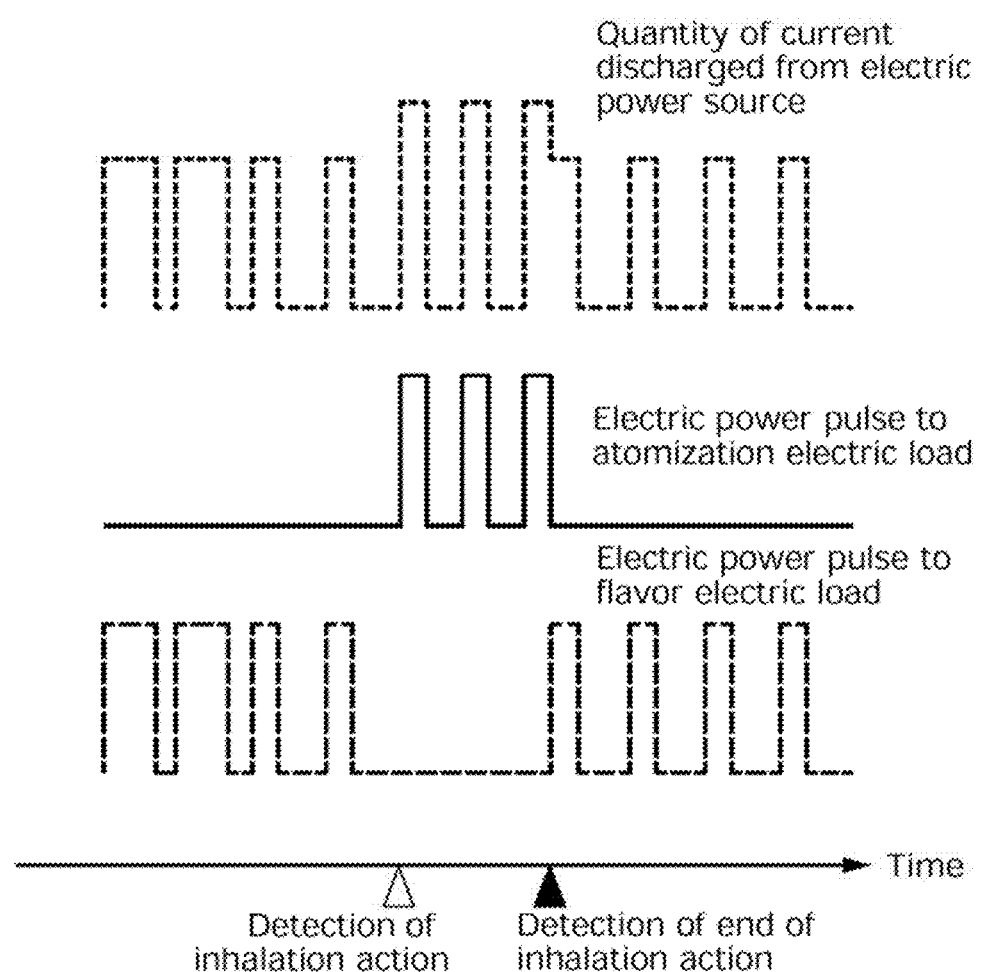
FIG. 7 is a graph showing an example of supply of electric power to an electric load for atomization and an electric load for flavor.

FIG. 7 shows a more tangible example of supply of electric power to the atomization electric load 122R and the flavor electric load 124R. In FIG. 7, a solid line (the line in the middle part) shows supply of electric power to the atomization electric load 122R. A broken line (the line in the lower part) shows supply of electric power to the flavor electric load 124R. A dotted line (the line in the upper part) shows the quantity of current discharged from the electric power source.

As explained above, the control unit 50 controls the electric circuit to supply electric power to the flavor electric load 124R during an inhalation cycle. Further, the control unit 50, when it has detected an inhalation action during an inhalation cycle, controls the electric circuit to supply electric power in the form of an electric power pulse to the atomization electric load 122R. The electric power pulse is generated by opening/closing the first switch 142 and the second switch 144.

In the first embodiment, as shown in FIG. 7, the control unit 50 is constructed in such a manner that electric power is not supplied from the electric power source 10 to both the atomization electric load 122R and the flavor electric load 124R at the same time during an inhalation action. Specifically, the control unit 50 operates to avoid simultaneous supply of electric power from the electric power source 10 to both the atomization electric load 122R and the flavor electric load 124R, when the control unit 50 has obtained a request for supply of electric power to the atomization electric load 122R and a request for supply of electric power to the flavor electric load 124R in the same period of time, or when the control unit 50 controls the circuit to perform supply of the atomization electric load 122R and supply of electric power to the flavor electric load 124R in the same period of time.

In a tangible example, the control unit 50 may turn the second switch 144 off during the period from detection of the start of an inhalation action to detection of the end of the inhalation action, to stop supply of electric power to the flavor electric load 124R.

If electric power is supplied to both the atomization electric load 122R and the flavor electric load 124R at the same time, the quantity of current discharged from the electric power source becomes larger than that in the case that electric power is supplied to either one of the atomization electric load 122R and the flavor electric load 124R, because the combined electric resistance value of the atomization electric load 122R and the flavor electric load 124R is smaller than the electric resistance value of each of the atomization electric load 122R and the flavor electric load 124R.

In the present embodiment, since the control unit 50 operates to avoid simultaneous supply of electric power from the electric power source 10 to both the atomization electric load 122R and the flavor electric load 124R, the electric power or the electric energy discharged from the electric power source 10 is reduced to that less than the maximum electric power or the maximum electric energy discharged when the electric power source 10 performs discharge to the first load and discharge to the second load at the same time. In other words, the control unit 50 functions as a reducing means which is constructed to reduce the electric power or the electric energy discharged from the electric power source 10 to that less than the maximum electric power or the maximum electric energy discharged when the electric power source 10 performs discharge to the first load and discharge to the second load at the same time. As a result, the load on the electric power source 10 can be reduced, and steep decrease of the remaining quantity of the electric power source 10 and/or tendency to accelerate progress of deterioration of the electric power source 10 can be suppressed.

Second Embodiment

In the first embodiment, the control unit 50 functioning as a reducing means turns the second switch 144 off during the period from detection of an inhalation action to detection of the end of the inhalation action. Instead of the above construction, in the second embodiment, the control unit 50 functioning as a reducing means turns the second switch 144 on even in the period from detection of an inhalation action to detection of the end of the inhalation action, to supply electric power to the flavor electric load 124.

Figure 8:
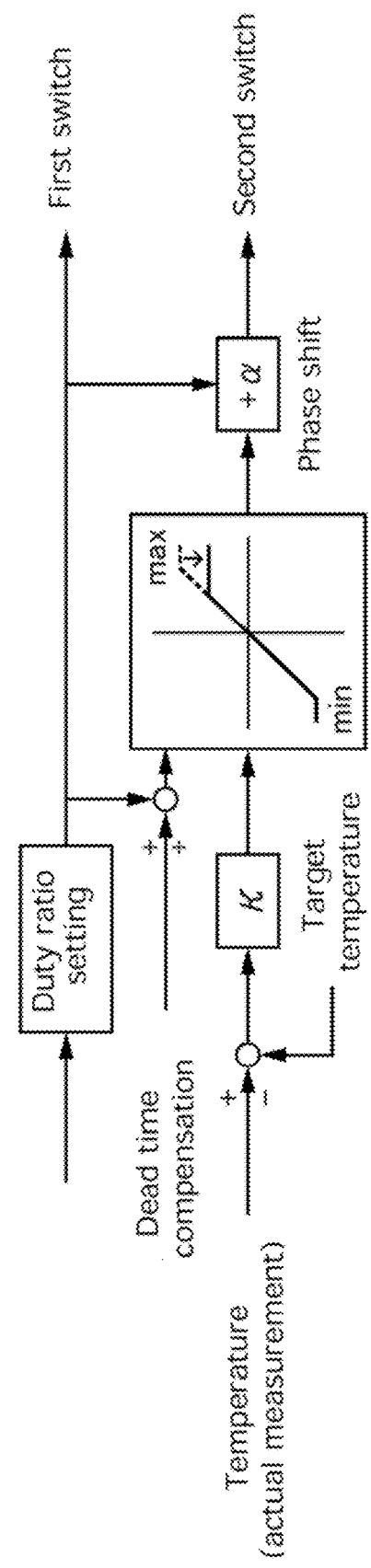
FIG. 8 is a control block diagram showing switching control of a first switch and a second switch.
Figure 9:
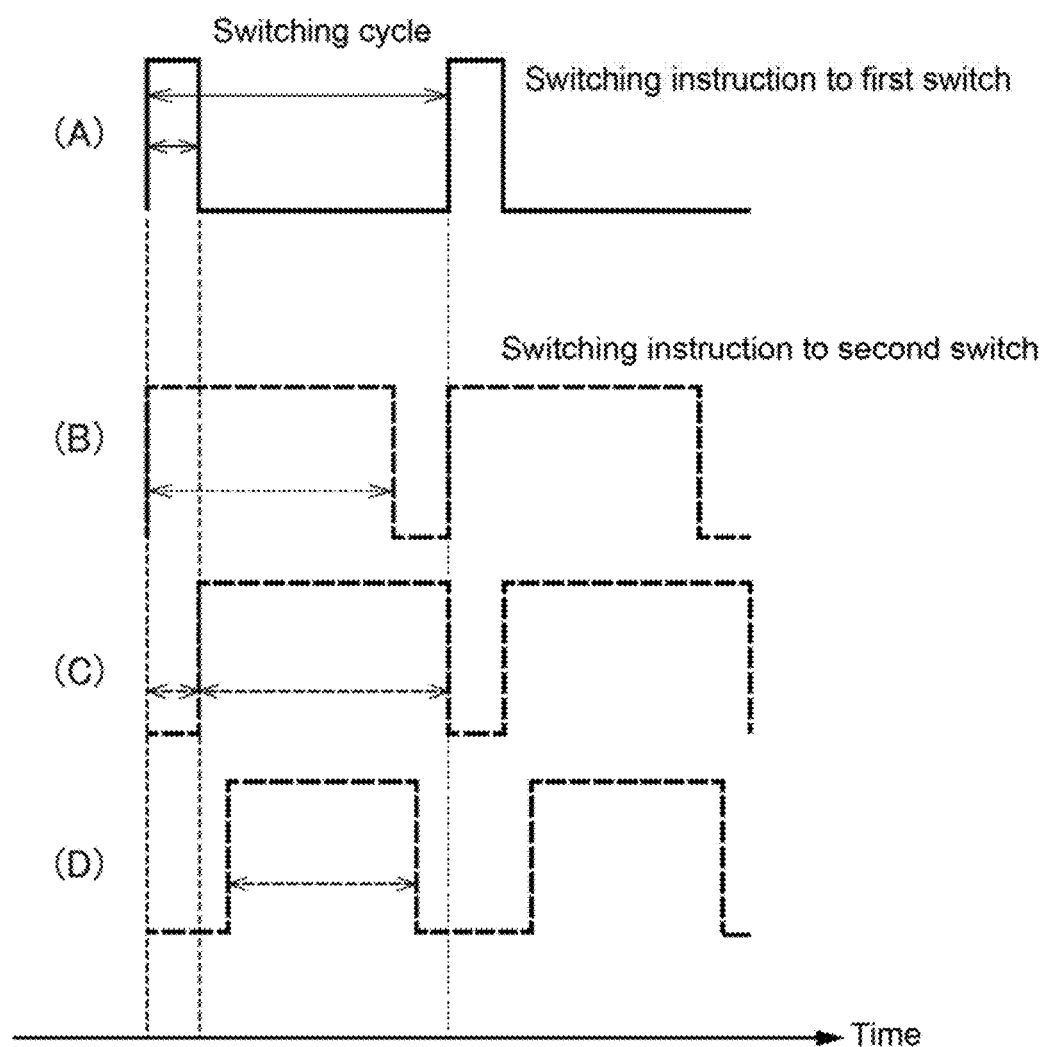
FIG. 9 is a graph showing switching control of the first switch and the second switch.

In the following description, an example of control relating to the second embodiment will be explained with reference to FIG. 8 and FIG. 9. FIG. 8 is a control block diagram showing switching control of the first switch 142 and the second switch 144. FIG. 9 is a graph showing switching control of the first switch 142 and the second switch 144. It should be reminded that, in place of the electric power pulse in FIG. 7, timing of a switching instruction to each of the first switch 142 and the second switch 144 is shown in FIG. 9. Also, it should be reminded that explanation relating to constructions similar to those in the first embodiment may be omitted in the following explanation.

In the second embodiment, the control unit 50 supplies electric power pulses to the atomization electric load 122R and the flavor electric load 124R even in the period from detection of an inhalation action to detection of the end of the inhalation action. Similar to the first embodiment, the control unit 50 may perform feedback control or feedforward control using PWM control or PFM control.

In the second embodiment, the control unit 50 supplies an ON instruction to the second switch 144 in a period between ON instructions to the first switch 142, as shown in FIG. 9 (refer to (D) in FIG. 9). In other words, the control unit 50 may turn on the second switch 144 in an OFF period of the first switch 142, even in the period from detection of an inhalation action to detection of the end of the inhalation action.

Such control may be realized in the manner explained below. First, the switching cycle of the first switch 142 and the switching cycle of the second switch 144 are set to coincide with each other. In this case, if timing of switching of the first switch 142 and that of the second switch 144 are set to coincide with each other, the first switch 142 and the second switch 144 are turned on at the same time, so that an ON instruction to the first switch 142 and an ON instruction to the second switch 144 are generated at the same time (refer to (A) and (B) of FIG. 9).

Thus, the control unit 50 functioning as a reducing means may be constructed to shift the phase of switching of the second switch 144 from the phase of switching of the first switch 142 by a period of time equal to or longer than the ON period of the first switch 142 (refer to FIG. 9 (C)). It should be reminded that, in the following description, shifting of a phase such as that explained above may be referred to as "phase shift."

In the example shown in (c) in FIG. 9, the phase of switching of the second switch 144 is shifted by a period of time equal to the ON period of the first switch 142. Such phase shift may be realized by setting, after determining the pulse width or the duty ratio of the first switch 142, the quantity of phase shift of the second switch 144 based on an ON period derived from the above pulse width or duty ratio (refer to FIG. 8 also).

As a result of phase shift such as that explained above, an ON period of the second switch 144 starts in an OFF period of the first switch. Thus, it becomes possible to suppress, when starting an ON period of the second switch 144, occurrence of a state that both the first switch 142 and the second switch 144 are turned on at the same time. Accordingly, the control unit 50 functioning as a reducing means can reduce electric power or electric energy discharged from the electric power source 10, at least when an ON period of the second switch 144 starts.

More preferably, the control unit 50 is constructed to shift the phase of switching of the second switch 144 from the phase of switching of the first switch 142 by a period of time much longer than the ON period of the first switch 142. Then, a predetermined period will be provided between the time when an OFF instruction is sent to the first switch 142 and the time when an ON instruction is sent to the second switch 144. Even if an OFF instruction is sent to a switch which is in an ON state, there is a predetermined turn-off time until the switch changes its state to an OFF state. Thus, a small quantity of current flows from the electric power source 10 in a short period of time after an OFF instruction is sent to the first switch 142. Accordingly, by providing a predetermined period between the time when an OFF instruction is sent to the first switch 142 and the time when an ON instruction is sent to the second switch 144, overlapping of an ON period of the first switch 142 and an ON period of the second switch 144 can be prevented. As a result, the control unit 50 functioning as a reducing means can reduce electric power or electric energy discharged from the electric power source 10, at least when an ON period of the second switch 144 starts.

Further, the control unit 50 functioning as a reducing means is constructed to set or correct at least one of the ON period of the first switch 142 and the ON period of the second switch 144 in such a manner that, during a single switching cycle, a sum of the ON period of the first switch 142 and the ON period of the second switch 144 does not exceed the switching cycle. In this regard, in the following description, adjustment of either one of ON periods such as that explained above may be referred to as "dead time compensation" (refer to FIG. 8). In the dead time compensation shown in FIG. 8, an ON period of the second switch 144 is shortened. As a result, it is ensured that an ON instruction is sent to the first switch 142 after an OFF instruction is sent again to the second switch 144 (refer to (C) and (D) in FIG. 9). Thus, the control unit 50 functioning as a reducing means can suppress occurrence of the state that the first switch 142 and the second switch 144 are turned on at the same time.

Dead time compensation such as that explained above can be realized by setting an upper limit of the pulse width of electric power to the flavor electric load 122R, the duty ratio, or the ON period of the second switch 144, based on the pulse width of electric power to the atomization electric load 122R, the duty ratio, or the ON period of the first switch 142. That is, the control unit 50 functioning as a reducing means is constructed to set or correct an ON period in switching control of the second switch 144 to reduce electric power or electric energy discharged from the electric power source 10.

As explained above, in the dead time compensation, the control unit 50 functioning as a reducing means may adjust at least one of the limiter's upper limit and proportional gain in feedback control, for reducing electric power supplied from the electric power source 10 to the flavor electric load 124R (refer to FIG. 8 also). In such a case, even in the construction that the electric pulse supplied to the flavor electric load 124R is made to be variable by feedback control, it is possible to prevent occurrence of the state that electric power supplied from the electric power source 10 to the flavor electric load 124R increases.

In the example shown in FIG. 8 and FIG. 9, the control unit 50 functioning as a reducing means is constructed to shift a phase of switching of the second switch 144 from a phase of switching of the first switch 142 by a period of time equal to or longer than an ON period of the first switch 142. Alternatively, the control unit 50 may shift a phase of switching of the first switch 142 from a phase of switching of the second switch 144 by a period of time equal to or longer than an ON period of the second switch 144. More preferably, the control unit 50 may shift a phase of switching of the first switch 142 from a phase of switching of the second switch 144 by a period of time much longer than an ON period of the second switch 144. Even in the above case, the electric pulse to the atomization electric load 122R and the electric pulse to the flavor electric load 124R do not overlap with each other, and are generated at shifted timing. As a result, the control unit 50 functioning as a reducing means can reduce electric power or electric energy discharged from the electric power source 10 to that less than maximum electric power or maximum electric energy discharged in the case that the electric power source performs discharge to the atomization electric load 122R and discharge to the flavor electric load 124R at the same time.

In the example shown in FIG. 8 and FIG. 9, the control unit 50 functioning as a reducing means is constructed to set or correct an ON period in switching control of the second switch 144 for reducing electric power or electric energy discharged from the electric power source 10. Alternatively, the control unit 50 functioning as a reducing means may be constructed to set or correct an ON period in switching control of the first switch 142 for reducing electric power or electric energy discharged from the electric power source 10. That is, the ON period of the first switch 142 may be shortened.

Further, in the case that electric power supplied to the atomization electric load 122R is controlled based on feedback control, the control unit 50 may adjust at least one of the limiter's upper limit and proportional gain in feedback control, for reducing electric power supplied from the electric power source 10 to the atomization electric load 122R.

Third Embodiment

In each of the first embodiment and the second embodiment, the control unit 50 mainly performs switching control for avoiding overlapping of an ON period of the first switch 142 and an ON period of the second switch 144. Instead of the above processing, the control unit 50 may perform switching control for allowing overlapping of part of an ON period of the first switch 142 and part of an ON period of the second switch 144. Even in the above case, the control unit 50 functioning as a reducing means can reduce electric power or electric energy discharged from the electric power source 10 to that less than maximum electric power or maximum electric energy discharged in the case that the electric power source performs discharge to the atomization electric load 122R and discharge to the flavor electric load 124R at the same time, since the period of time that both the first switch 142 and the second switch 144 are being turned on is reduced.

In the case that electric pulses are supplied to both the atomization electric load 122R and the flavor electric load 124R at the same time as explained above, the control unit 50 may be constructed to set or correct at least one of a variable or a mode in switching control of the first switch 122 and a variable or a mode in switching control of the second switch 124, to reduce electric power or electric energy discharged from the electric power source 10.

Figure 10:
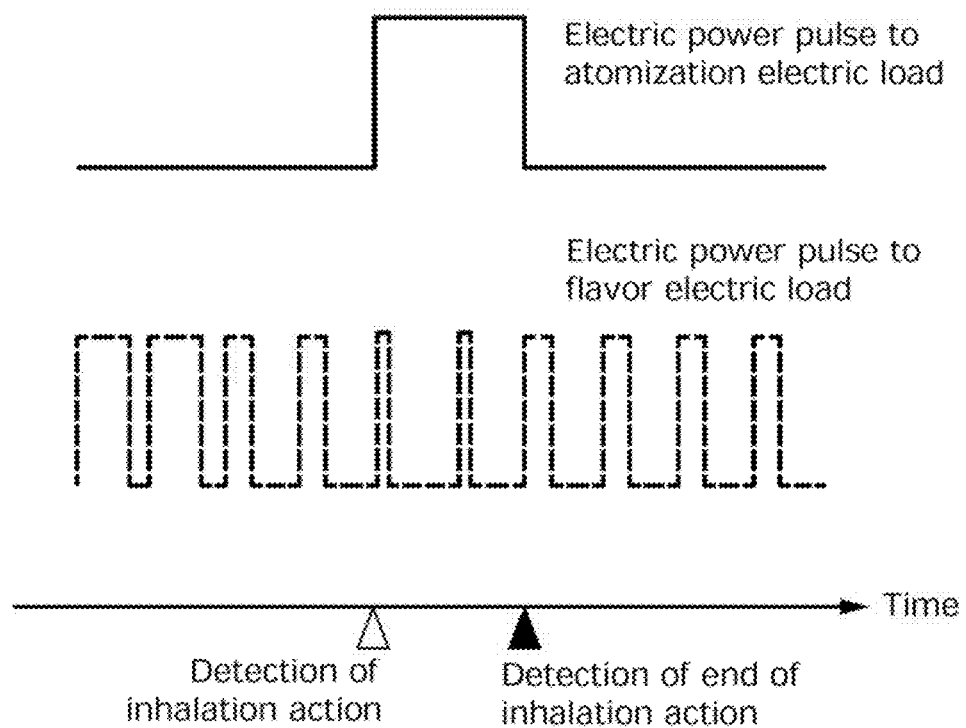
FIG. 10 is a graph showing a different example of supply of electric power to an electric load for atomization and an electric load for flavor.

In a tangible example, the control unit 50 functioning as a reducing means is constructed to shorten at least one of an ON period of the first switch 142 and an ON period of the second switch 144, in the case that electric power is supplied to both the atomization electric load 122R and the flavor electric load 124R at the same time. For example, as shown in FIG. 10, the control unit 50 operates to shorten an ON period of the second switch 144, in the case that a request for supply of electric power to the atomization electric load 122R and a request for supply of electric power to the flavor electric load 124R are received in the same period of time. Specifically, the control unit 50 operates to shorten an ON period of the second switch 144 during the period from detection of an inhalation action to detection of an end of inhalation action. Such control can be realized by lowering a duty ratio in PWM control. The ON period of the second switch 144 and the duty ratio in PWM control are tangible examples of variables in switching control of the second switch 144.

Figure 11:
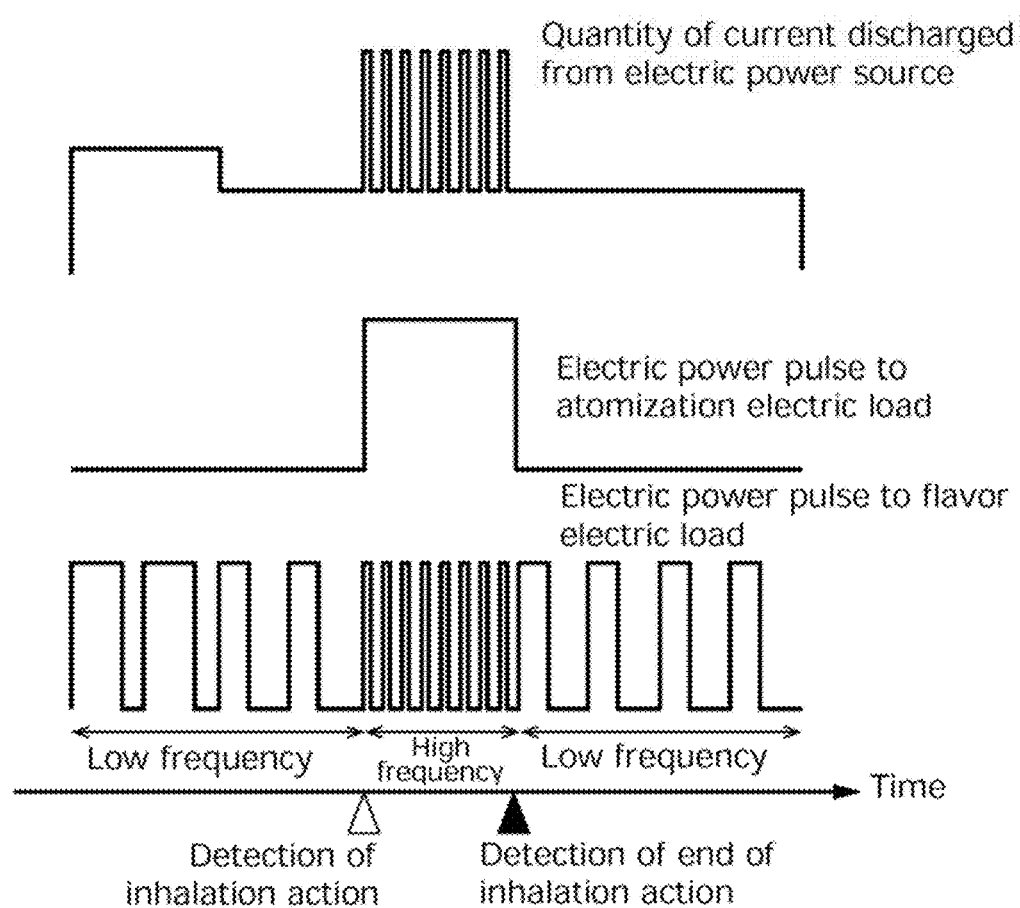
FIG. 11 a graph showing a further different example of supply of electric power to an electric load for atomization and an electric load for flavor.

In a different tangible example, the control unit 50 functioning as a reducing means is constructed to shorten at least one of a switching cycle of the first switch 142 and a switching cycle of the second switch 144, in the case that electric power is supplied to both the atomization electric load 122R and the flavor electric load 124R at the same time. In the above case, the control unit 50 may maintain the duty ratio of switching of the first switch 142 and that of the second switch 144. As a result, in PWM control, the width of each electric power pulse can be reduced. For example, as shown in FIG. 11, the control unit 50 operates to shorten the switching cycle of the second switch 144 while maintaining the duty ratio of the second switch 144, during the period from detection of an inhalation action to detection of the end of the inhalation action. The switching cycle of the first switch 142 is a tangible example of a variable in switching control of the first switch 142. The switching cycle of the second switch 144 is a tangible example of a variable in switching control of the second switch 144.

In a different tangible example, the control unit 50 may be constructed to control at least one of the first switch 142 and the second switch 144, based on feedback control or feedforward control using PFM control instead of PWM control, in the case that electric pulses are supplied to both the atomization electric load 122R and the flavor electric load 124R at the same time. In the above case, the control unit 50 may determine a duty ratio to reduce electric power that is supplied to the flavor electric load 124R at the same time when electric power is supplied to the atomization electric load 122R, or reduce electric power that is supplied to the atomization electric load 122R at the same time when electric power is supplied to the flavor electric load 124R. By switching it to PFM control, it becomes possible to vary an OFF period without changing a pulse width. That is, if an upper limit of a pulse width (an ON period) is set in advance, increase in the integrated value of electric power supplied to the flavor electric load 124R can be suppressed, in the period from detection of an inhalation action to detection of the end of the inhalation action. PWM control or PFM control for controlling the first switch 142 is a tangible example of a mode in switching control of the first switch 142. PWM control or PFM control for controlling the second switch 144 is a tangible example of a mode in switching control of the second switch 144.

Fourth Embodiment

Figure 12:
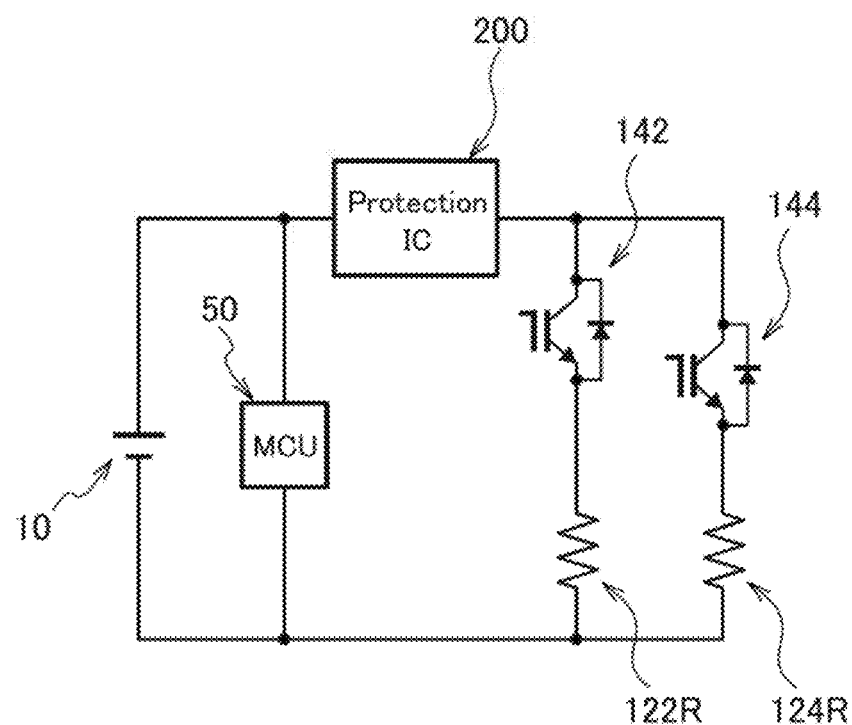
FIG. 12 is a schematic diagram of an electric circuit of a flavor generating device which comprises an atomizing unit and an electric power source unit in a fourth embodiment.
Figure 13:
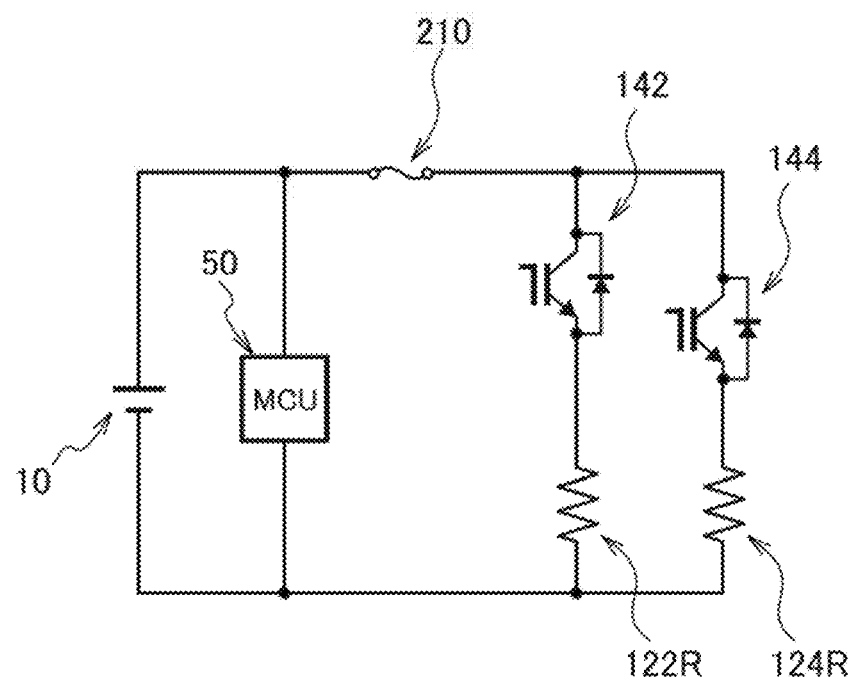
FIG. 13 is a schematic diagram of a modified example of the electric circuit of the flavor generating device which comprises the atomizing unit and the electric power source unit in a fourth embodiment.

Each of FIG. 12 and FIG. 13 is a schematic diagram of an electric circuit of a flavor generating devices which comprises an atomizing unit and an electric power source unit in a fourth embodiment. In the example shown in FIG. 12, the flavor generating device comprises a protection integrated circuit 200 which has a rated current value larger than a value of maximum current that can be supplied to one of the atomization electric load 122R and the flavor electric load 124R. The above protection integrated circuit 200 prevents the flow of large current that may cause a problem in the electric circuit. Especially, the protection integrated circuit 200 is useful in the case that control, that may make the atomization electric load 122R and the flavor electric load 124R be turned on at the same time, is performed.

Instead of the above protection integrated circuit 200, it may be possible to use an electrical (power) fuse 210 which has a rated current value that is larger than a value of maximum current that can be supplied to one of the atomization electric load 122R and the flavor electric load 124R.

In the case that protection integrated circuit 200 or the electrical fuse 210 explained above is provided, it is preferable that the control unit 50 functioning as a reducing means be constructed to control the electric circuit in such a manner that a sum of current (first current) supplied to the atomization electric load 122R and current (second current) supplied to the flavor electric load 124R does not exceed the above rated current value. In other words, the above-explained phase shifting, dead time compensation, reducing of a pulse width or an upper limit of the duty ratio, and/or feedback control or the like may be performed, for avoiding occurrence of a state that the sum of the first current and the second current, that is, the maximum value of current discharged from the electric power source 10, exceeds the rated current value.

Especially, in the case that an electrical fuse is used, the circuit will be opened if current having a value larger than a rated current value flows for a period of rated time; so that the control unit 50 may control the first switch 142 and the second switch 144 in such a manner that the sum of the first current and the second current becomes a value less than the rated current value, or the period of time that the first current and the second current overlap with each other becomes a time less than the rated time.

In this regard, it may be possible to use, as a reducing means, the protection integrated circuit 200 or the electrical fuse 210 itself which cuts off the circuit, if current having a value larger than a value of the maximum current that can be supplied to one of the atomization electric load 122R and the flavor electric load 124R starts to flow.

Further, it may be possible to use a thermal fuse instead of the protection integrated circuit 200 or the electrical fuse 210 (FIG. 13). Regarding a thermal fuse, it is fused when current having a value larger than a rated current value flows for a predetermined time corresponding to the current value. Thus, it is preferable that the thermal fuse have a rated current value equal to or less than half of the value of current that flows when electric power is supplied to both the atomization electric load 122R and the flavor electric load 124R at the same time, for further ensuring protection of the electric circuit. It is also possible to use such a thermal fuse as a reducing means.

Fifth Embodiment

Figure 14:
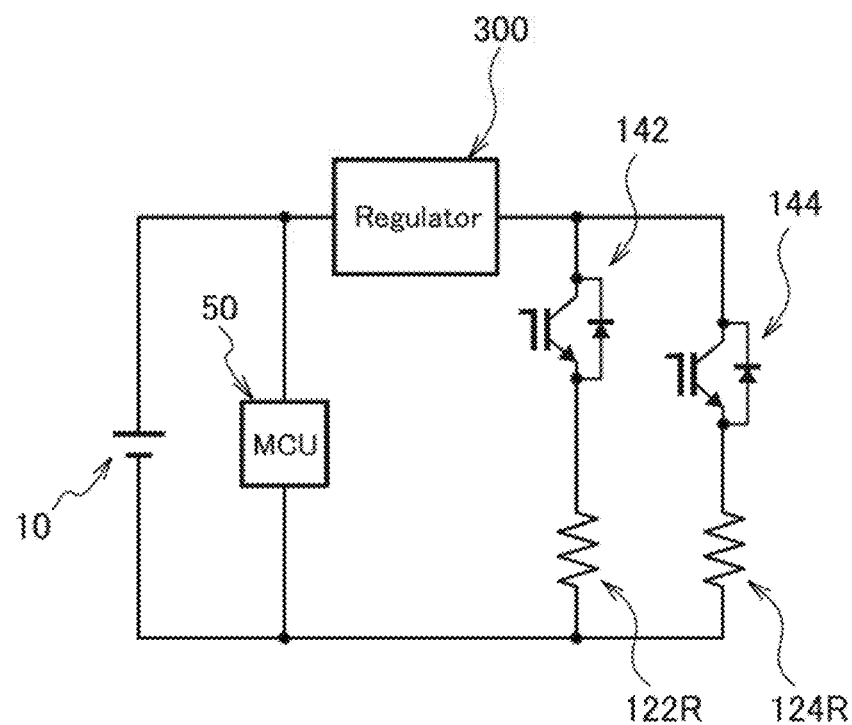
FIG. 14 is a schematic diagram of an electric circuit of a flavor generating device which comprises an atomizing unit and an electric power source unit in a fifth embodiment.

FIG. 14 is a schematic diagram of an electric circuit of a flavor generating device which comprises an atomizing unit and an electric power source unit in a fifth embodiment. In the fifth embodiment, a circuit which is a component of the flavor generating device comprises a regulator 300 for adjusting current outputted to at least one of the atomization electric load 122R and the flavor electric load 124R.

In the example shown in FIG. 14, the regulator 300 is arranged in a position where both the current supplied to the atomization electric load 122R and the current supplied to the flavor electric load 124R flows through. In other words, the regulator 300 is arranged in a position between a node at a high-voltage side of parallel connection of the atomization electric load 122R and the flavor electric load 124R and a positive-electrode side of the electric power source 10. In the above case, the regulator 300 adjusts current outputted to both the atomization electric load 122R and the flavor electric load 124R.

Alternatively, the regulator 300 may be arranged in a position where the current supplied to the atomization electric load 122R flows through although the current supped to the flavor electric load 124R does not flow through, or a position where the current supped to the flavor electric load 124R flows through although the current supplied to the atomization electric load 122R does not flow through. In other words, the regulator 300 may be positioned between the above-explained high-voltage-side node and the first switch 142, or between the above-explained high-voltage-side node and the second switch 144. In the above case, the regulator 300 can adjust current outputted to the atomization electric load 122R or the flavor electric load 124R.

The control unit 50 may be constructed to reduce the value of current or the value of electric power outputted by the regulator 300, when a request for supply of electric power to the atomization electric load 122R and a request for supply of electric power to the flavor electric load 124R are received in the same period of time, or when the circuit is controlled to perform supply of electric power to the atomization electric load 122R and supply of electric power to the flavor electric load 124R in the same period of time. That is, the regulator 300 functions as at least a part of a reducing means for reducing the current value. Regarding a tangible example of the regulator 300, it may comprise a linear regulator or a switching regulator. In this regard, in the case that a switching regulator is used and either one of the first switch 142 and the second switch 144 is turned on by the control unit 50, switching in the switching regulator may be stopped to make a conduction state only be kept.

As explained above, in the case that the regulator 300 for reducing the current value is used, complicated control of electric power pulses, that has been explained in relation to the above embodiments, may be omitted. However, it is possible to use the regulator 300 such as that explained in the fifth embodiment and the control of electric power pulses explained in relation to the above embodiments together with each other.

Sixth Embodiment

Figure 15:
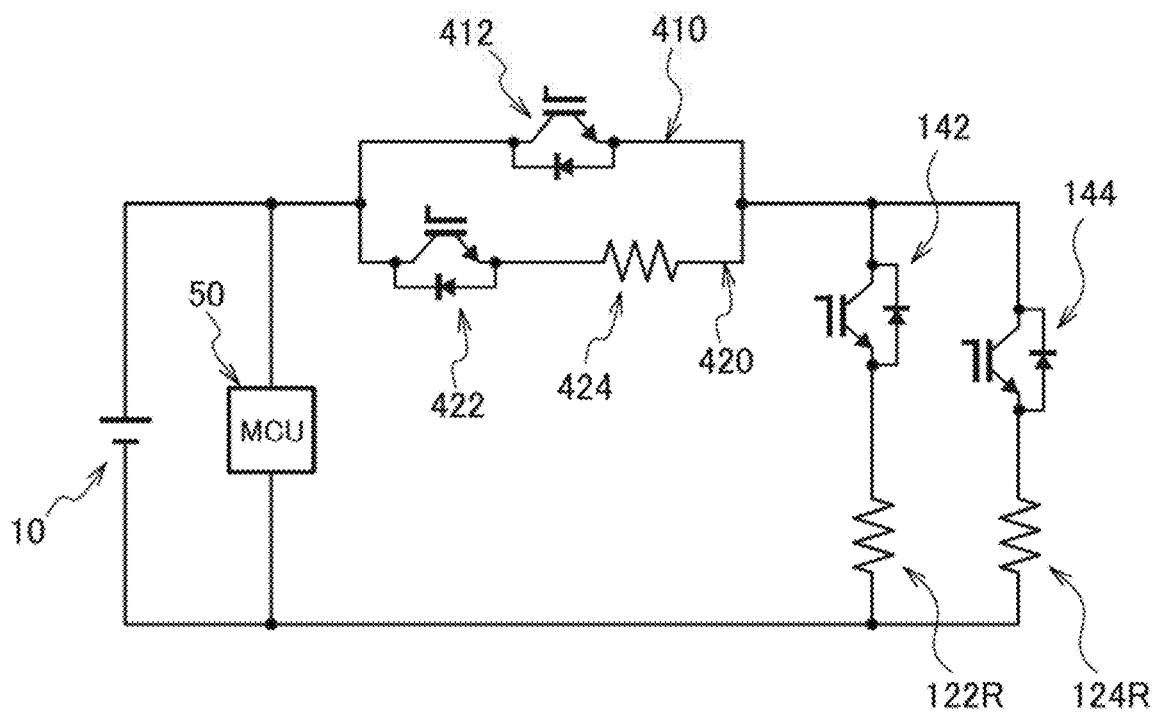
FIG. 15 is a schematic diagram of an electric circuit of a flavor generating device which comprises an atomizing unit and an electric power source unit in a sixth embodiment.

FIG. 15 is a schematic diagram of an electric circuit of a flavor generating device which comprises an atomizing unit and an electric power source unit in a sixth embodiment. In the sixth embodiment, a first circuit 410 and a second circuit 420 which are connected in parallel with each other are provided, instead of the regulator 300 in the fifth embodiment.

The first circuit 410 is provided with a third switch 412. The second circuit 420 is provided with a fourth switch 422. The electric resistance value of the second circuit 420 is higher than that of the first circuit 410. In this embodiment, the second circuit 420 is provided with a resistance 424.

The control unit 50 can control the third switch 412 and the fourth switch 422 to open/close them, respectively. In the case that the third switch 412 is in an ON state and the fourth switch 422 is in an OFF state, current discharged from the electric power source 10 passes through the first circuit 410 without passing through the second circuit 420. In the case that the third switch 412 is in an OFF state and the fourth switch 422 is in an ON state, current discharged from the electric power source 10 passes through the second circuit 420 without passing through the first circuit 410. In this regard, since the electric resistance value of the second circuit 420 is higher than that of the first circuit 410, the value of current passing through the second circuit 420 is reduced, if the second circuit 420 is activated without activating the first circuit 410. That is, the value of current discharged from the electric power source 10 can be reduced.

The control unit 50 activates the second circuit 420 without activating the first circuit 410, when a request for supply of electric power to the atomization electric load 122R and a request for supply of electric power to the flavor electric load 124R are received in the same period of time, or when the circuit is controlled to perform supply of electric power to the atomization electric load 122R and supply of electric power to the flavor electric load 124R in the same period of time. More specifically, the control unit 50 may activate the second circuit 420 without activating the first circuit 410, when turning both the first switch 142 and the second switch 144 on at the same time. On the other hand, the control unit 50 may activate the first circuit 410 without activating the second circuit 420, when turning either one of the first switch 142 and the second switch 144 on. As a result, the control unit 50 can reduce electric power or electric energy discharged from the electric power source 10 when both the first switch 142 and the second switch 144 are turned on at the same time. That is, the first circuit 410 and the second circuit 420 can be used as reducing means.

Seventh Embodiment

Figure 16:
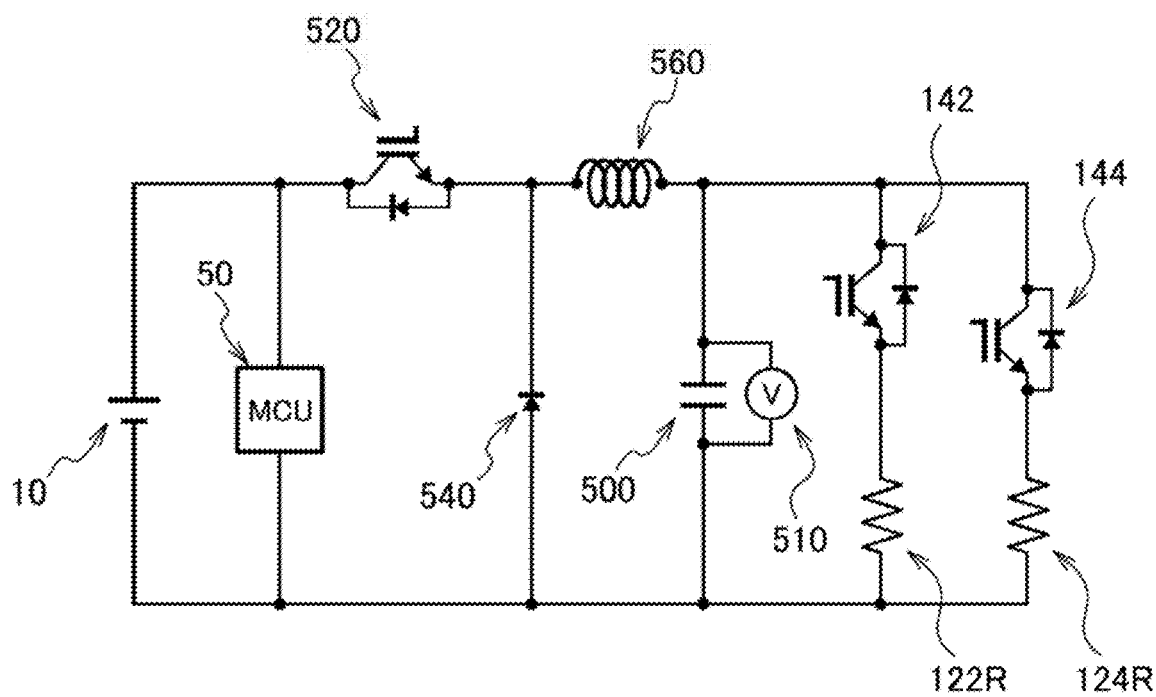
FIG. 16 is a schematic diagram of an electric circuit of a flavor generating device which comprises an atomizing unit and an electric power source unit in a seventh embodiment.

FIG. 16 is a schematic diagram of an electric circuit of a flavor generating device which comprises an atomizing unit and an electric power source unit in a seventh embodiment. The constructions of the electric power source 10, the control unit 50, the atomization electric load 122R, the flavor electric load 124R, the first switch 142, and the second switch 144 are similar to those in the first embodiment.

In the seventh embodiment, the flavor generating device comprises an auxiliary electric power source 500 which can perform discharge to the atomization electric load 122R and the flavor electric load 124R. As shown in FIG. 16, the auxiliary electric power source 500, the atomization electric load 122R, and the flavor electric load 124R are connected in parallel with each other in relation to the electric power source 10. As a result, it is constructed that the current discharged from the auxiliary electric power source 500 may flow to the atomization electric load 122R and/or the flavor electric load 124R.

Preferably, the auxiliary electric power source 500 may be a chargeable/dischargeable electric power source. In such a case, if the quantity of charge of the auxiliary electric power source 500 is low, the auxiliary electric power source 500 is charged by electric power from the electric power source 10. On the other hand, when the quantity of charge of the auxiliary electric power source 500 is high, current discharged therefrom flows to the atomization electric load 122R and the flavor electric load 124R. It is preferable that the auxiliary electric power source 500 have power density (W/kg) higher than that of the electric power source 10. For example, an electric double layer capacitor (EDLC, Electric double-layer capacitor) may be used as the auxiliary electric power source 500.

In the seventh embodiment, current discharged from the electric power source 10 becomes smaller as the output voltage (the quantity of charge) of the auxiliary electric power source 500 becomes larger. Thus, by using the auxiliary electric power source 500, electric power or electric energy discharged from the electric power source 10 can be reduced. As explained above, the auxiliary electric power source 500 functions as a reducing means for reducing electric power or electric energy discharged from the electric power source 10.

The control unit 50 may be able to obtain a value relating to the remaining quantity of the auxiliary electric power source 500. The value relating to the remaining quantity of the auxiliary electric power source 500 may be a voltage of the auxiliary electric power source 500, for example. It may be possible to obtain or estimate the voltage of the auxiliary electric power source 500 by using a voltage sensor 510, for example. In such a case, it is preferable that the control unit 50 be constructed to control the circuit in such a manner that electric power or electric energy discharged from the electric power source 10 is decreased as the value relating to the remaining quantity, for example, the voltage, of the auxiliary electric power source 500 becomes larger. The electric power or the electric energy discharged from the electric power source 10 may be controlled by a converter which comprises a switch 520, a backflow preventing diode 540, and an inductor 560, for example. The converter is not limited to that explained above, and the converter may be that which is positioned between the electric power source 10 and the auxiliary electric power source 500 and is able to convert the magnitude of at least one of inputted current, an inputted voltage, and inputted electric power and output it/them. It should be reminded that the electric power or the electric energy discharged from the electric power source 10 can be controlled by performing adjustment of the duty ratio of the electric power pulses by the switch 520, instead of using the above-explained converter. As explained above, the auxiliary electric power source 500 can be utilized effectively, by using it to adjust the electric power or the electric energy discharged from the electric power source 10 based on the value relating to the remaining quantity of the auxiliary electric power source 500.

Eighth Embodiment

Figure 17:
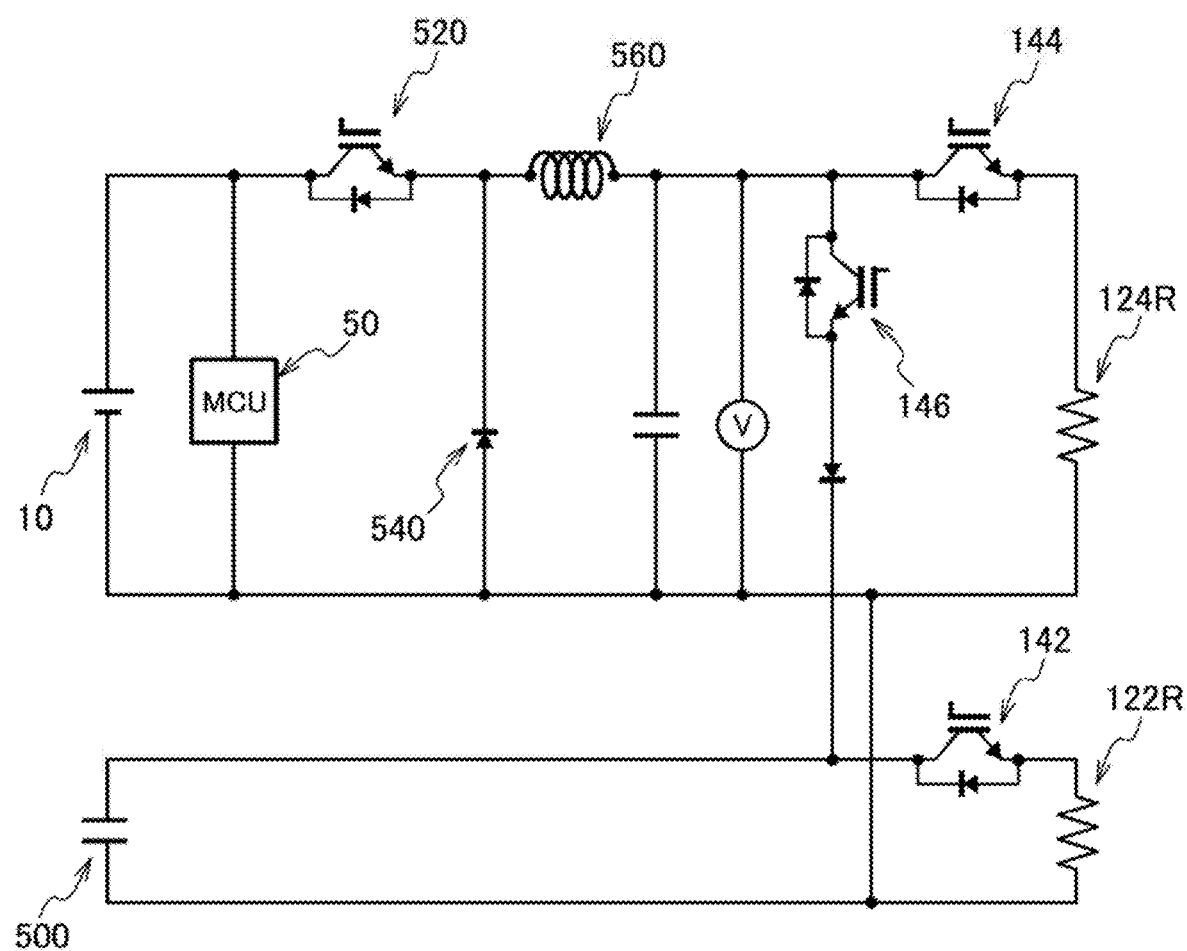
FIG. 17 is a schematic diagram of an electric circuit of a flavor generating device which comprises an atomizing unit and an electric power source unit in an eighth embodiment.

FIG. 17 is a schematic diagram of an electric circuit of a flavor generating device which comprises an atomizing unit and an electric power source unit in an eighth embodiment. The constructions of the electric power source 10, the control unit 50, the atomization electric load 122R, the flavor electric load 124R, the first switch 142, and the second switch 144 are substantially similar to those in the seventh embodiment. However, the position of the auxiliary electric power source 500 is different from that in the seventh embodiment.

The auxiliary electric power source 500 is arranged in a position where it can make discharge current flow to the atomization electric load 122R although it cannot make discharge current flow to the flavor electric load 124R. That is, the auxiliary electric power source 500 functions as a dedicated auxiliary electric power source of the atomization electric load 122R. In this regard, it is preferable that the auxiliary electric power source 500 be that which is chargeable/dischargeable as explained in relation to the seventh embodiment.

Further, the flavor generating device 100 comprises a fifth switch 146 for allowing or prohibiting the flow of discharge current from the electric power source 10 to the auxiliary electric power source 500 and/or the atomization electric load 122R. The fifth switch 146 is constructed to be able to be opened/closed by the control unit 50. Thus, when the fifth switch 146 is in an ON state, the auxiliary electric power source 500 may be charged by electric power from the electric power source 10.

Further, the first switch 142 may be able to allow or prohibit the flow of discharge current from the electric power source 10 or the auxiliary electric power source 500 to the atomization electric load 122R. The second switch 144 may be able to allow or prohibit the flow of discharge current from the electric power source 10 to the flavor electric load 124R.

In the eighth embodiment, various modes can be implemented based on combinations of ON/OFF states of the first switch 142, the second switch 144, and the fifth switch 146.

In the case that all the first switch 142, the second switch 144, and the fifth switch 146 are in OFF states, electric power is not supplied to the atomization electric load 122R and the flavor electric load 124R. In the case that the electric power source 10 is a chargeable/rechargeable secondary battery and the electric power source 10 is to be charged from an external electric power source, all the first switch 142, the second switch 144, and the fifth switch 146 may be turned off.

In the case that the first switch 142 only is in an ON state, and the second switch 144 and the fifth switch 146 are in OFF states, the atomization electric load 122R can be activated since discharge current from the auxiliary electric power source 500 flows to the atomization electric load 122R. In this case, no electric power is supplied to the flavor electric load 124R.

In the case that the second switch 144 only is in an ON state, and the first switch 142 and the fifth switch 146 are in OFF states, the flavor electric load 124R can be activated since discharge current from the electric power source 10 flows to the flavor electric load 124R. In this case, no electric power is supplied to the atomization electric load 122R.

In the case that the fifth switch 146 only is in an ON state, and the first switch 142 and the second switch 144 are in OFF states, no electric power is supplied to the atomization electric load 122R and the flavor electric load 124R. In this regard, since the electric power from the electric power source 10 flows into the auxiliary electric power source 500, the auxiliary electric power source 500 can be charged thereby.

In the case that the first switch 142 only is in an OFF state, and the second switch 144 and the fifth switch 146 are in ON states, the flavor electric load 124R can be activated since discharge current from the electric power source 10 flows to the flavor electric load 124R. In this case, no electric power is supplied to the atomization electric load 122R. Further, since the electric power from the electric power source 10 flows into the auxiliary electric power source 500, the auxiliary electric power source 500 can be charged thereby.

In the case that the second switch 144 only is in an OFF state, and the first switch 142 and the fifth switch 146 are in ON states, the atomization electric load 122R can be activated since discharge current from both the electric power source 10 and the auxiliary electric power source 500 flows to the atomization electric load 122R. In this case, no electric power is supplied to the flavor electric load 124R. In the above case, discharge current from the electric power source 10 can be reduced, compared with the case that electric power is supplied only from the electric power source 10, i.e., without using the auxiliary electric power source 500, to the atomization electric load 122R.

In the case that the fifth switch 146 only is in an OFF state, and the first switch 142 and the second switch 144 are in ON states, discharge current from the auxiliary electric power source 500 flows to the atomization electric load 122R, and discharge current from the electric power source 10 flows to the flavor electric load 124R. Thus, the electric power source 10 and the auxiliary electric power source 500 supply, in an individual manner, electric power to the flavor electric load 124R and the atomization electric load 122R, respectively.

In the case that all the first switch 142, the second switch 144, and the fifth switch 146 are in ON states, discharge current from the electric power source 10 flows to the flavor electric load 124R. Further, discharge current from both the electric power source 10 and the auxiliary electric power source 500 flows to the atomization electric load 122R. In this case, discharge current from the electric power source 10 can be reduced, compared with the case that electric power is supplied only from the electric power source 10, i.e., without using the auxiliary electric power source 500, to the atomization electric load 122R and the flavor electric load 124R at the same time. Thus, similar to the seventh embodiment, the auxiliary electric power source 500 functions as a reducing means for reducing electric power or electric energy discharged from the electric power source 10.

(Program and Storage Medium)

The flow relating to the above-explained embodiments can be executed by the control unit 50. That is, the control unit 50 may comprise a program which makes the flavor generating device 100 execute the above-explained methods. A program such as that explained above is also included in the scope of the present invention. Further, it should be reminded that a storage medium in which the above program is stored is also included in the scope of the present invention. A storage medium such as that explained above may be a computer-readable nonvolatile storage medium.

Other Embodiments

The present invention has been explained with reference to the above embodiments; however, it should be reminded that the descriptions and figures, which are part of the present disclosure, are not those for limiting the present invention. Based on the present disclosure, various alternative embodiments, examples, and operation techniques would become obvious to a person skilled in the art.

For example, in the above embodiments, cases wherein the first load defined in the claims is the atomization electric load 122R (first load) and the second load defined in the claims is the flavor electric load 124R (second load) have been explained tangibly. However, the constructions are not limited to those explained above, and the first load may be an electric load which atomizes an aerosol source or heats a flavor source. Thus, it should be reminded that there may be an embodiment wherein the first load corresponds to the flavor electric load 124R.

Further, there is no special limitation with respect to the second load as long as it is an electric load different from the first load. For example, the second load may be a light emitting element such as a LED.

Further, it should be reminded that the constructions and control explained in the above plural embodiments can be combined and/or exchanged where possible.

The invention claimed is:

1. A flavor generating device comprising:
 a circuit for electrically connecting an electric power source, a first load, and a second load which is different from the first load; and
 a controller configured to control the circuit to control supply of electric power from the electric power source to the first load and the second load, respectively, to create an aerosol with flavor,
 wherein the first load is an induction heating element,
 wherein the first load and the second load are arranged at different positions which do not overlap each other in a longitudinal direction of the flavor generating device,
 wherein the circuit comprises:
  a first switch for opening/closing electric connection between the first load and the electric power source; and
  a second switch for opening/closing electric connection between the second load and the electric power source,
 wherein the controller is configured to:
  open the second switch during generation of a plurality of electric power pulses by opening/closing of the first switch, and
  open the first switch during generation of a plurality of electric power pulses by opening/closing of the second switch, and
 wherein a current supplied from the electric power source to the second load by closing the second switch is larger than a current supplied from the electric power source to the first load by closing the first switch.

2. The flavor generating device according to claim 1, wherein the controller is further configured to:
 control the first switch or the second switch to open and close to modulate widths of the plurality of electric power pulses generated by opening/closing the first switch or the second switch.

3. The flavor generating device according to claim 1, wherein the controller is further configured to:
 control the circuit to include, before and after first periods in which the plurality of electric power pulses are generated by opening/closing the second switch, a second period in which the plurality of electric power pulses is generated by opening/closing the first switch.

4. The flavor generating device according to claim 3, wherein the controller is further configured to control the circuit such that the second period includes a period which is longer than the first period.

5. The flavor generating device according to claim 1, wherein the first load is positioned closer to a suction opening of the flavor generating device from which the aerosol with flavor is discharged than the second load.

6. The flavor generating device according to claim 1, the flavor generating device further comprising a cylindrical body,
 wherein the first load is positioned in a space around the cylindrical body.

* * * * *